United States Patent
Hoshi

(10) Patent No.: US 11,211,893 B2
(45) Date of Patent: Dec. 28, 2021

(54) MOTOR CONTROLLER

(71) Applicant: Mitsubishi Electric Corporation, Tokyo (JP)

(72) Inventor: Takumi Hoshi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 99 days.

(21) Appl. No.: 16/652,796

(22) PCT Filed: Nov. 16, 2017

(86) PCT No.: PCT/JP2017/041265
§ 371 (c)(1),
(2) Date: Apr. 1, 2020

(87) PCT Pub. No.: WO2019/097627
PCT Pub. Date: May 23, 2019

(65) Prior Publication Data
US 2020/0259447 A1     Aug. 13, 2020

(51) Int. Cl.
*H02P 29/028*     (2016.01)
*H02P 25/22*      (2006.01)
*H02P 27/08*      (2006.01)

(52) U.S. Cl.
CPC ............ *H02P 29/028* (2013.01); *H02P 25/22* (2013.01); *H02P 27/085* (2013.01)

(58) Field of Classification Search
CPC ...... H02P 29/028; H02P 25/22; H02P 27/085; H02P 29/024
(Continued)

(56) References Cited

U.S. PATENT DOCUMENTS 7,462,999 B2 * 12/2008 Mitchell ............... G01R 31/343
318/400.01
2010/0052583 A1    3/2010 Takamatsu et al.
(Continued)

FOREIGN PATENT DOCUMENTS

JP     2010057243 A    3/2010
JP     2012181564 A    9/2012
(Continued)

OTHER PUBLICATIONS

International Search Report (PCT/ISA/210) dated Feb. 13, 2018, by the Japan Patent Office as the International Searching Authority for International Application No. PCT/JP2017/041265.

*Primary Examiner* — David Luo
(74) *Attorney, Agent, or Firm* — Buchanan Ingersoll & Rooney PC

(57) ABSTRACT

A UVW-phase inverter control circuit has a control function of generating a UVW-phase inverter control signal. An XYZ-phase inverter control circuit has a control function of generating an XYZ-phase inverter control signal. The control function of the UVW-phase inverter control circuit is stopped during execution of a BIST. A phase conversion unit generates a UVW-phase inverter control signal by phase conversion for the control signal from the XYZ-phase inverter control circuit. During execution of the BIST by the UVW-phase inverter control circuit, a selector outputs the inverter control signal from the phase conversion unit as a UVW-phase inverter control signal, and a selector outputs the inverter control signal from the XYZ-phase inverter control circuit as an XYZ-phase inverter control signal.

10 Claims, 15 Drawing Sheets

(58) Field of Classification Search
USPC .......................................... 318/496, 495, 494
See application file for complete search history.

(56) References Cited

U.S. PATENT DOCUMENTS

2013/0090809 A1   4/2013   Kuroda
2015/0293173 A1  10/2015   Tsuboi et al.

FOREIGN PATENT DOCUMENTS

| JP | 2013079027 A  | 5/2013  |
| JP | 2015206785 A  | 11/2015 |
| WO | 2017159091 A1 | 9/2017  |

* cited by examiner

FIG.10

| Sbs1 | Sbs2 | Ssl1 (171) | Ssl2 (172) | |
|---|---|---|---|---|
| 1 | 0 | 1 | 0 | Su, Sv, Sw=S1# <br> Sx, Sy, Sz=S2 |
| 0 | 1 | 0 | 1 | Su, Sv, Sw=S1 <br> Sx, Sy, Sz=S2# |
| 0 | 0 | 0 | 0 | Su, Sv, Sw=S1 <br> Sx, Sy, Sz=S2 |

MOTOR CONTROLLER

TECHNICAL FIELD

The present disclosure relates to a motor controller, and more particularly to a motor controller having a self-diagnosis function for an abnormality.

BACKGROUND ART

In a system requiring high safety, each component in the system may be required to have a self-diagnosis function for detecting an abnormality. Such a system is known to conduct a self-diagnosis by a built-in self test (BIST) for a computing device such as a microcomputer in response to occurrence of an error.

For example, Japanese Patent Laying-Open No. 2012-181564 (PTL 1) discloses that function blocks for executing a BIST are switched between: the case where an error occurs at a cold start upon power-up; and the case of a hot start at which a reset is caused due to a failure occurring during a normal operation. Specifically, in the case of a cold start, all of the BISTs are executed. In the case of a hot start, on the other hand, the BIST only for the function blocks related to an error is executed. Thereby, the reset cancelling time including a self-diagnosis in the BIST started during a normal operation can be shortened.

CITATION LIST

Patent Literature

PTL 1: Japanese Patent Laying-Open No. 2012-181564

SUMMARY OF INVENTION

Technical Problem

In the configuration disclosed in PTL 1, the reset cancelling time can be shortened, whereas the system is stopped by the reset until the BIST ends. Thus, a problem occurs when the configuration disclosed in PTL 1 is applied to usage for which stopping of the system cannot be acceptable.

On the other hand, a multiplex-system configuration including a plurality of the same functions is employed so as to eliminate system stop caused by the BIST, which causes a problem of cost increase. Particularly in the case of an application specific integrated circuit (ASIC) such as a large scale integrated circuit (LSI) for motor control, functions need to be multiplexed for a scanning test, which may increase the circuit scale, thereby significantly increasing the cost.

The present disclosure has been made in order to solve the above-described problems. An object of the present disclosure is to provide an abnormality detection device that does not require multiplexing of the same control function and still implements a self-diagnosis for a control function without stopping a system.

Solution to Problem

In an aspect of the present disclosure, a motor controller has a function of controlling a motor including a plurality of windings that are disposed to correspond to respective ones of a plurality of phases arranged in a predetermined sequential order. The motor controller includes a first control circuit, a second control circuit, a self-diagnosis control circuit, and a control signal supply circuit. The first control circuit has a first control function for generating a control signal for a voltage to be applied to each of the plurality of windings, and a self-diagnosis function for an abnormality related to the first control function. The second control circuit has a second control function for generating the control signal, the second control function being different from the first control function, and a self-diagnosis function for an abnormality related to the second control function. The self-diagnosis control circuit instructs one control circuit of the first control circuit and the second control circuit to execute an abnormality diagnosis test by the self-diagnosis function. During execution of the abnormality diagnosis test in the one control circuit, the control signal supply circuit supplies the control signal using an output from the other control circuit of the first control circuit and the second control circuit. The control signal is equivalent to the control signal supplied when the abnormality diagnosis test is not executed in both the first control circuit and the second control circuit.

According to the above-mentioned motor controller, by an abnormality diagnosis test by one control circuit of the first control circuit and the second control circuit having different control functions, a control signal equivalent to that supplied when not executing an abnormality diagnosis test can be supplied using the output from the other control circuit even when the control function of the one control circuit is stopped. Accordingly, an abnormality detection device can be provided that does not require multiplexing of the same control function and still implements a self-diagnosis for a control function without stopping a system.

Advantageous Effects of Invention

According to the present disclosure, an abnormality detection device can be provided that does not require multiplexing of the same control function and still implements a self-diagnosis for a control function without stopping a system.

BRIEF DESCRIPTION OF DRAWINGS

FIG. 10 shows a table for illustrating operations of selectors 171 and 172 in the motor controller according to the first embodiment.

DESCRIPTION OF EMBODIMENTS

Figure 1:
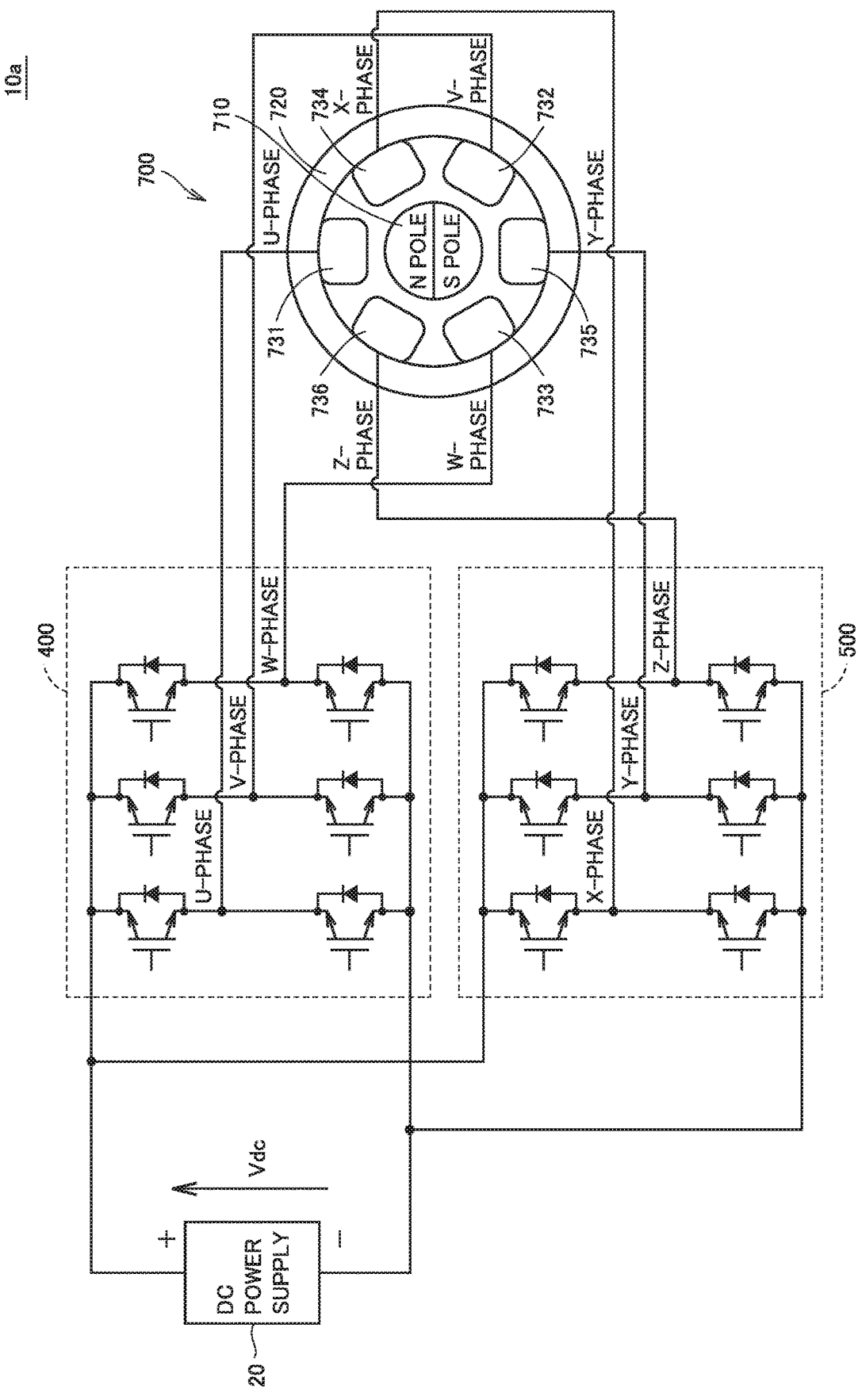
FIG. 1 is a block diagram showing the schematic configuration of a motor system controlled by a motor controller according to the first embodiment.

The embodiments of the present disclosure will be hereinafter described with reference to the accompanying drawings. In the following description, the same or corresponding components in the accompanying drawings are designated by the same reference characters, and description thereof will not be basically repeated.

First Embodiment

FIG. 1 is a block diagram showing the schematic configuration of a motor system controlled by a motor controller according to the first embodiment.

Referring to FIG. 1, a motor system 10a includes a direct-current (DC) power supply 20, a UVW-phase inverter 400, an XYZ-phase inverter 500, and a motor 700.

Motor 700 includes a rotor 710 and a stator 720. FIG. 1 shows an example of motor 700 as a permanent-magnet type synchronous motor including rotor 710 provided with a permanent magnet. Stator 720 includes: a UVW-phase winding group formed of a U-phase winding 731, a V-phase winding 732 and a W-phase winding 733; and an XYZ-phase winding group formed of an X-phase winding 734, a Y-phase winding 735 and a Z-phase winding 736.

U-phase winding 731, V-phase winding 732 and W-phase winding 733 are displaced from each other by an angle of 120 degrees. Similarly, X-phase winding 734, Y-phase winding 735 and Z-phase winding 736 are displaced from each other by an angle of 120 degrees.

The U-phase, the V-phase, the W-phase, the X-phase, the Y-phase, and the Z-phase are arranged in a predetermined order such that the phases belonging to different winding groups are located adjacent to each other. For example, as shown in FIG. 1, windings 731 to 736 in their respective phases can be arranged such that the U-phase, the X-phase, the V-phase, the Y-phase, the W-phase, and the Z-phase (and the U-phase) are arranged in this order so as to be displaced from each other by 60 degrees in the clockwise direction with respect to the U-phase disposed at the twelve o'clock position.

DC power supply 20 can be configured of a power converter for converting alternating-current (AC) power from a commercial power supply into a DC voltage and/or a power storage device such as a battery. Furthermore, DC power supply 20 may be configured to have a function of variably controlling an output voltage Vdc (DC).

UVW-phase inverter 400 converts output voltage Vdc from DC power supply 20 into a three-phase AC voltage and applies the converted three-phase AC voltage to U-phase winding 731, V-phase winding 732 and W-phase winding 733. As shown in FIG. 1, UVW-phase inverter 400 can be implemented by a commonly-used configuration in which a semiconductor switching element is disposed in each of an upper arm and a lower arm in each of the U-phase, the V-phase and the W-phase.

U-phase winding 731 has one end electrically connected to a connection point between the semiconductor switching elements in the upper arm and the lower arm in the U-phase of UVW-phase inverter 400. Similarly, V-phase winding 732 and W-phase winding 733 each have one end electrically connected to the connection point between the semiconductor switching elements in the upper arm and the lower arm in a corresponding one of the V-phase and the W-phase of UVW-phase inverter 400. U-phase winding 731, V-phase winding 732 and W-phase winding 733 have the other ends interconnected to a neutral point (not shown).

XYZ-phase inverter 500 converts output voltage Vdc from DC power supply 20 into a three-phase AC voltage and applies the converted three-phase AC voltage to X-phase winding 734, Y-phase winding 735 and Z-phase winding 736. As shown in FIG. 1, XYZ-phase inverter 500 can also be implemented by a commonly-used configuration in which a semiconductor switching element is disposed in each of the upper arm and the lower arm in each of the X-phase, the Y-phase and the Z-phase. X-phase winding 734, Y-phase winding 735 and Z-phase winding 736 each have one end electrically connected to the connection point between the semiconductor switching elements in the upper arm and the lower arm in a corresponding one of the X-phase, the Y-phase and the Z-phase of XYZ-phase inverter 500. The other ends of X-phase winding 734, Y-phase winding 735 and Z-phase winding 736 are interconnected at a neutral point (not shown) different from that of the UVW-phase.

Figure 2:
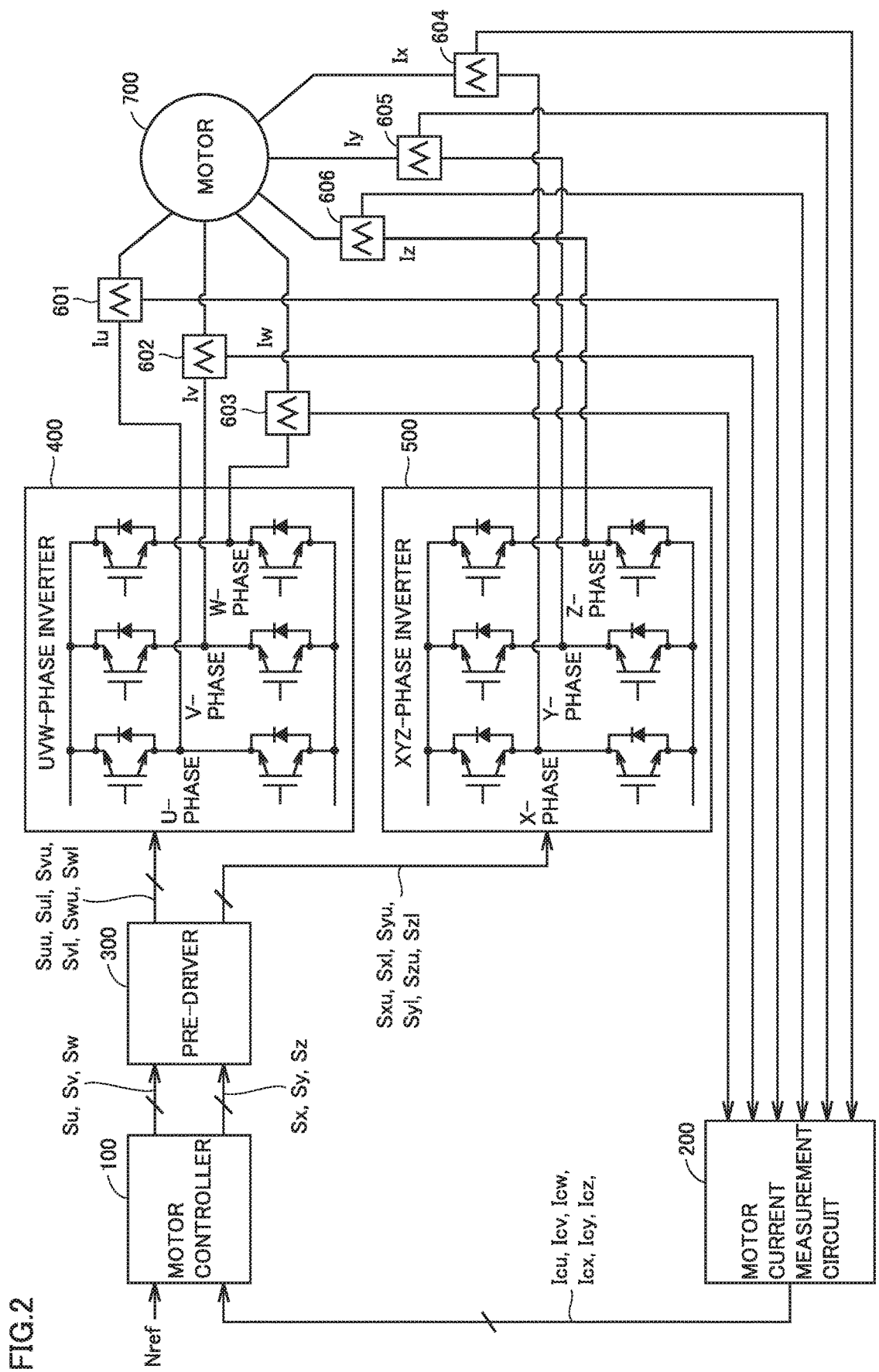
FIG. 2 is a block diagram illustrating the schematic configuration of motor control in the motor system shown in FIG. 1.

FIG. 2 is a block diagram illustrating the schematic configuration of motor control in motor system 10a shown in FIG. 1.

Referring to FIG. 2, UVW-phase inverter 400 and XYZ-phase inverter 500 generate three-phase AC voltages for operating motor 700 according to an operation command value (for example, a rotation speed command value Nref of motor 700) and apply the generated three-phase AC voltages to the UVW-phase winding group and the XYZ-phase winding group, respectively. Furthermore, current detectors 601 to 606 are disposed for detecting a current generated in each of phases of motor 700 by the three-phase AC voltages applied by UVW-phase inverter 400 and XYZ-phase inverter 500.

The detected value of a U-phase current Iu by U-phase current detector 601, the detected value of a V-phase current Iv by V-phase current detector 602 and the detected value of a W-phase current Iw by W-phase current detector 603 are input into a motor current measurement circuit 200. Similarly, the detected value of an X-phase current Ix by X-phase current detector 604, the detected value of a Y-phase current Iy by Y-phase current detector 605 and the detected value of a Z-phase current Iz by Z-phase current detector 606 are input into motor current measurement circuit 200.

Based on the detected values by current detectors 601 to 606, motor current measurement circuit 200 outputs inverter on/off determination signals Icu, Icv, Icw, Icx, Icy, and Icz in respective phases.

Figure 3:
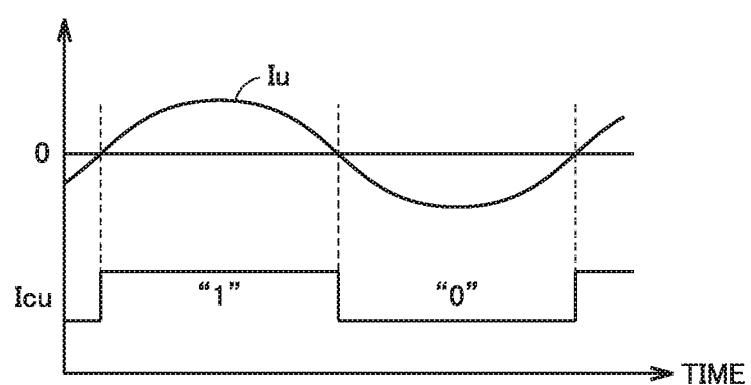
FIG. 3 is a conceptual waveform diagram for illustrating an inverter on/off determination signal output from a motor current measurement circuit shown in FIG. 2.

FIG. 3 is a conceptual waveform diagram for illustrating the inverter on/off determination signal output from motor current measurement circuit 200. FIG. 3 shows a waveform example of inverter on/off determination signal Icu in the U-phase by way of example.

Referring to FIG. 3, inverter on/off determination signal Icu is set at "1 (logic high level)" in the time period in which U-phase current Iu≥0 and set at "0 (logic low level)" in the time period in which U-phase current Iu<0. In this way, the inverter on/off determination signal in each phase is generated as a digital signal showing a pulse-like waveform so as to be set at "1" in the time period in which the current detection value in the corresponding phase is positive and to be set at "0" in the time period in which the current detection value in the corresponding phase is negative.

Accordingly, it is understood that the inverter on/off determination signal in each phase has a period corresponding to the rotation speed of motor 700. In other words, motor current measurement circuit 200 has a function of converting the current (an analog signal) in each of the phases of motor 700 into a digital signal for detecting the rotation speed of motor 700.

Again referring to FIG. 2, inverter on/off determination signals Icu, Icv, Icw, Icx, Icy, and Icz in respective phases from motor current measurement circuit 200 are input into motor controller 100. Motor controller 100 can be representatively configured by a one-chip digital circuit. For example, a microcomputer, application specific integrated circuit (ASIC) and a field-programmable gate array (FPGA) can be used as motor controller 100.

Motor controller 100 generates inverter control signals Su, Sv, Sw, Sx, Sy and Sz in respective phases for controlling, according to rotation speed command value Nref, the rotation speed of motor 700 detected by the inverter on/off determination signal in each phase. Inverter control signals Su, Sv and Sw correspond to the on/off control signals for the semiconductor switching elements in respective phases of UVW-phase inverter 400 for controlling the voltage applied from UVW-phase inverter 400 to U-phase winding 731, V-phase winding 732 and W-phase winding 733.

Similarly, inverter control signals Sx, Sy and Sz correspond to on/off control signals for the semiconductor switching elements in respective phases of XYZ-phase inverter 500 for controlling the voltage applied from XYZ-phase inverter 500 to X-phase winding 734, Y-phase winding 735 and Z-phase winding 736.

A pre-driver 300 receives U-phase, V-phase and W-phase inverter control signals Su, Sv and Sw to generate drive control signals Suu (U-phase upper arm), Sul (U-phase lower arm), Svu (V-phase upper arm), Svl (V-phase lower arm), Swu (W-phase upper arm), and Swl (W-phase lower arm) for the semiconductor switching elements in the upper and lower arms in each of the phases of UVW-phase inverter 400.

Similarly, pre-driver 300 receives X-phase, Y-phase and Z-phase inverter control signals Sx, Sy and Sz to generate drive control signals Sxu (X-phase upper arm), Sxl (X-phase lower arm), Syu (Y-phase upper arm), Syl (Y-phase lower arm), Szu (Z-phase upper arm), and Szl (Z-phase lower arm) for the semiconductor switching elements in the upper and lower arms in each of the phases of XYZ-phase inverter 500. Generally, pre-driver 300 is configured to electrically insulate motor controller 100 from UVW-phase inverter 400 and XYZ-phase inverter 500 using a photo coupler or the like.

Drive control signals Suu, Sul, Svu, Svl, Swu, and Swl are input into UVW-phase inverter 400. Similarly, drive control signals Sxu, Sxl, Syu, Syl, Szu, and Szl are input into XYZ-phase inverter 500.

In this way, by controlling UVW-phase inverter 400 according to inverter control signals Su, Sv and Sw, a pseudo-AC voltage obtained by switching output voltage Vdc (DC) on DC power supply 20 can be set as a voltage to be applied to U-phase winding 731, V-phase winding 732 and W-phase winding 733. Similarly, by controlling XYZ-phase inverter 500 according to inverter control signals Sx, Sy and Sz, a pseudo-AC voltage obtained by switching output voltage Vdc (DC) on DC power supply 20 can be set as a voltage to be applied to X-phase winding 734, Y-phase winding 735 and Z-phase winding 736. According to the periods and the effective values (or the fundamental wave components) of these applied voltages, the rotation speed and the rotation direction of motor 700 (rotor 710) can be controlled.

Figure 4:
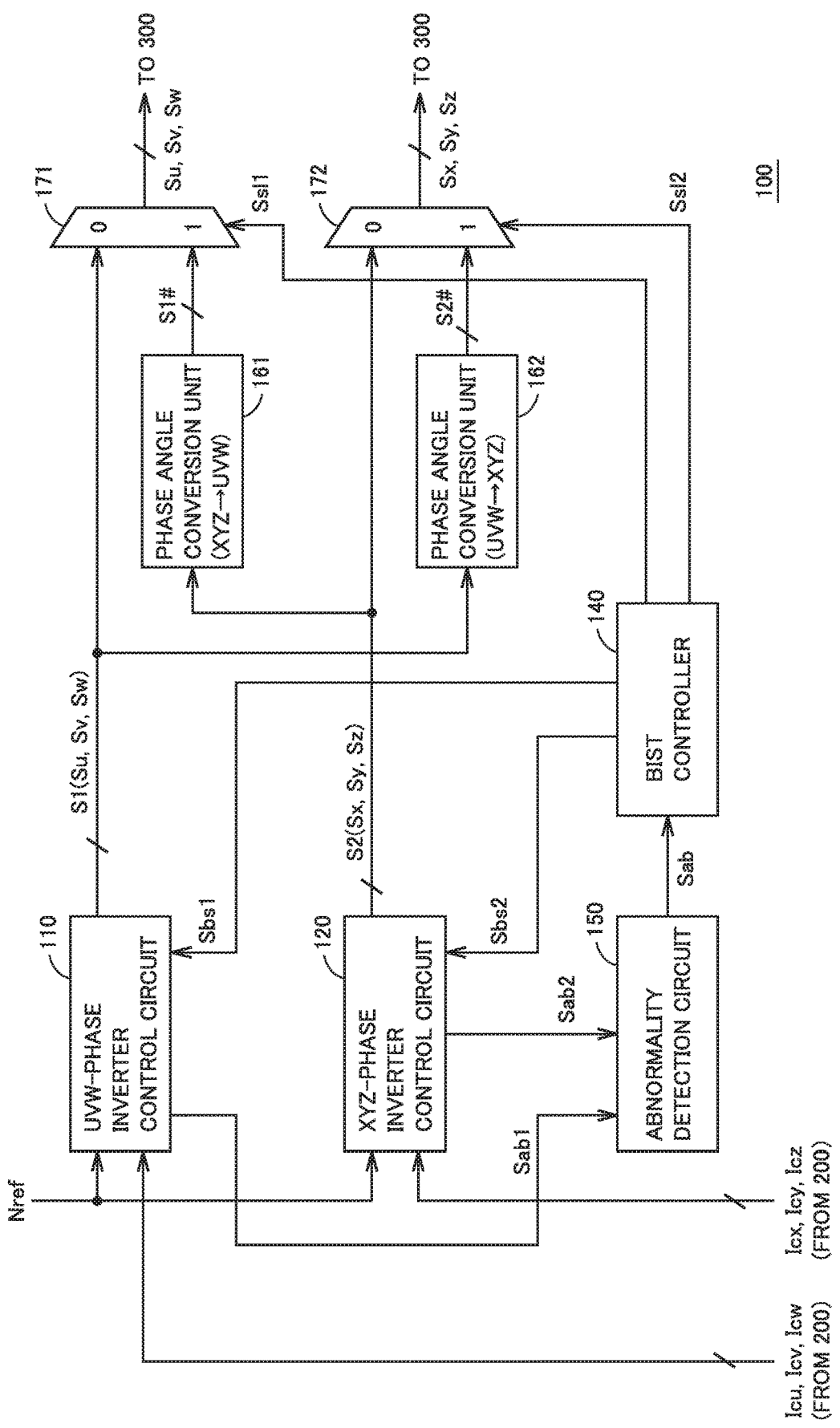
FIG. 4 is a functional block diagram for illustrating the configuration of the motor controller according to the first embodiment.
Figure 5:
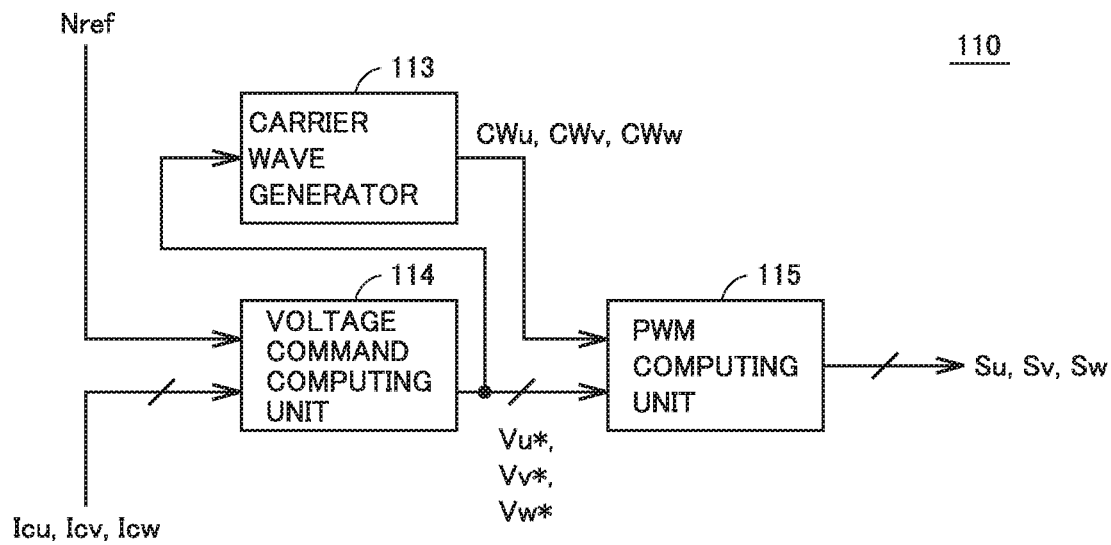
FIG. 5 is a functional block diagram for further illustrating the configuration of a UVW-phase inverter control circuit shown in FIG. 4.
Figure 6:
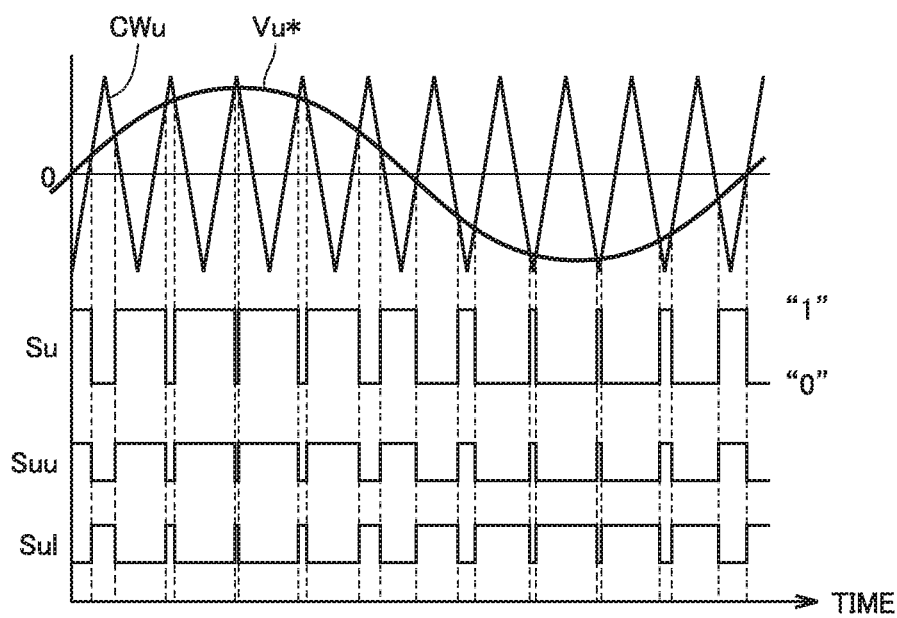
FIG. 6 is a conceptual waveform diagram for illustrating PWM control by the UVW-phase inverter control circuit.

Referring to FIGS. 4 to 6, the details of motor control and an abnormality diagnosis therefor by motor controller 100 will be further hereinafter described.

FIG. 4 is a functional block diagram for illustrating the configuration of motor controller 100 in detail. In the following description, each of functional blocks shown as components of motor controller 100 is implemented by software processing by execution of the software stored in advance or hardware processing by a dedicated electronic circuit (a logic circuit), or by a combination of the hardware processing and the software processing.

Referring to FIG. 4, motor controller 100 includes a UVW-phase inverter control circuit 110 and an XYZ-phase inverter control circuit 120. Furthermore, motor controller 100 includes a BIST controller 140, an abnormality detection circuit 150, a phase angle conversion units 161, 162, and selectors 171, 172, each of which is provided for controlling an abnormality diagnosis by the BIST.

UVW-phase inverter control circuit 110 generates U-phase, V-phase and W-phase inverter control signals Su, Sv and Sw based on inverter on/off determination signals Icu, Icv and Icw from motor current measurement circuit 200 and rotation speed command value Nref. For example, UVW-phase inverter control circuit 110 generates inverter control signals Su, Sv and Sw such that the voltage applied from UVW-phase inverter 400 is PWM (pulse width modulation)-controlled.

FIG. 5 shows a functional block diagram for further illustrating the configuration of UVW-phase inverter control circuit 110.

Referring to FIG. 5, UVW-phase inverter control circuit 110 includes a carrier wave generator 113, a voltage command computing unit 114, and a PWM computing unit 115.

Based on the periods of inverter on/off determination signals Icu, Icv and Icw and rotation speed command value Nref, voltage command computing unit 114 generates U-phase, V-phase and W-phase voltage command values Vu*, Vv* and Vw* for feedback-controlling the motor rotation speed. Carrier wave generator 113 generates carrier waves CWu, CWv and CWw having frequencies equal to the integral multiples of voltage command values Vu*, Vv* and Vw*. For example, carrier waves CWu, CWv and CWw each can be a triangular wave, a sawtooth wave and the like. PWM computing unit 115 generates inverter control signals Su, Sv and Sw according to the comparison between the carrier wave voltage and the voltage command value for each of the U-, V- and W-phases.

FIG. 6 shows a conceptual waveform diagram for illustrating PWM control by UVW-phase inverter control circuit 110.

Referring to FIG. 6, by voltage command computing unit 114 (FIG. 5), voltage command value Vu* is generated as a sinusoidal AC voltage having a period according to the rotation speed command value of motor 700 in the next control period. In this case, the rotation speed command value is not Nref itself, but is calculated so as to compensate for the deviation between Nref and the present value of the rotation speed detected from the period of inverter on/off determination signal Icu. In this case, it is preferable that the rotation speed command value is calculated so as to gradually compensate for the deviation in consideration of the energy efficiency in motor 700.

The amplitude of voltage command value Vu* can be used for controlling the torque acting on motor 700. For example, by controlling the voltage amplitude based on the difference between the present value of the rotation speed and the rotation speed command value in the next control period, the speed can be smoothly controlled.

Carrier wave CWu is generated by carrier wave generator 113 (FIG. 5) so as to have a frequency equal to the integral multiple (ten times higher in the example in FIG. 6) of the frequency of voltage command value Vu* (that is, synchronous PWM control). Alternatively, carrier wave CWu may be generated so as to have a fixed frequency (that is, asynchronous PWM control).

PWM computing unit 115 (FIG. 5) generates U-phase inverter control signal Su according to the voltage comparison between carrier wave CWu and voltage command value Vu*. Specifically, PWM computing unit 115 sets inverter control signal Su at "1" to turn on the upper arm element in the time period of Vu*>CWu, and sets inverter control signal Su at "0" to turn on the lower arm element in the time period of Vu*<CWu.

In the time period during which inverter control signal Su="1", pre-driver 300 (FIG. 2) sets the condition such that drive control signal Suu="1" and Sul="0" in order to turn on the upper arm element in the U-phase and to turn off the lower arm element in the U-phase. In contrast, in the time period during which inverter control signal Su="0", pre-driver 300 sets the condition such that drive control signals Sul="1" and Suu="0" in order to turn on the lower arm element in the U-phase and to turn off the upper arm element in the U-phase. Thereby, the pulse voltage forming a pseudo-sinusoidal voltage is applied to one end of U-phase winding 731 according to inverter control signal Su.

Also in the V-phase and the W-phase, voltage command values Vv* and Vw* are similarly generated. Then, inverter control signals Sv and Sw are generated according to the PWM control by voltage comparison between voltage command values Vv*, Vw* and carrier waves CWv, CWw. Thus, inverter control signals Sv and Sw each also have a pulse period depending on the rotation speed of motor 700 similarly to inverter control signal Su. Voltage command value Vv* is generated so as to have a phase difference of 120 degrees with respect to voltage command value Vu*. Also, voltage command value Vw* is generated so as to have a phase difference of 120 degrees with respect to voltage command value Vv*.

Again referring to FIG. 4, XYZ-phase inverter control circuit 120 generates X-phase, Y-phase and Z-phase inverter control signals Sx, Sy and Sz based on inverter on/off determination signals Icx, Icy and Icz from motor current measurement circuit 200 and rotation speed command value Nref. For example, XYZ-phase inverter control circuit 120 generates inverter control signals Sx, Sy and Sz by PWM control as in UVW-phase inverter control circuit 110 that has been described with reference to FIGS. 5 and 6. Accordingly, inverter control signals Sx, Sy and Sz each also have a pulse period corresponding to the rotation speed of motor 700 similarly to inverter control signals Su, Sv and Sw.

Furthermore, each of UVW-phase inverter control circuit 110 and XYZ-phase inverter control circuit 120 is configured to have an abnormality self-diagnosis function. For example, when a BIST instruction signal Sbs1 from BIST controller 140 is set at "1", UVW-phase inverter control circuit 110 autonomously executes an abnormality diagnosis test (BIST) programmed in advance. Since UVW-phase inverter control circuit 110 stops its original control function during execution of the BIST, it stops generation of inverter control signals Su, Sv and Sw.

Similarly, when a BIST instruction signal Sbs2 from BIST controller 140 is set at "1", XYZ-phase inverter control circuit 120 autonomously executes an abnormality diagnosis test programmed in advance. When this abnormality diagnosis test ends, each of UVW-phase inverter control circuit 110 and XYZ-phase inverter control circuit 120 transmits a BIST end signal and a signal showing the test result to BIST controller 140. Furthermore, during execution of the BIST by XYZ-phase inverter control circuit 120, generation of inverter control signals Sx, Sy and Sz is stopped.

In this way, UVW-phase inverter control circuit 110 has a control function (the first control function) of generating U-phase, V-phase, and W-phase inverter control signals Su, Sv and Sw while XYZ-phase inverter control circuit 120 has a control function (the second control function) of generating X-phase, Y-phase, and Z-phase inverter control signals Sx, Sy and Sz. In other words, UVW-phase inverter control circuit 110 and XYZ-phase inverter control circuit 120 have different control functions and do not configure a multiplex system of the same function.

In other words, in the first embodiment, UVW-phase inverter control circuit 110 corresponds to one example of the "first control circuit", and inverter control signals Su, Sv and Sw correspond to the "first control signal". Furthermore, XYZ-phase inverter control circuit 120 corresponds to one example of the "second control circuit", and inverter control signals Sx, Sy and Sz correspond to the "second control signal". Furthermore, BIST controller 140 corresponds to one example of the "self-diagnosis control circuit".

UVW-phase inverter control circuit 110 outputs an abnormality occurrence signal Sab1. Abnormality occurrence signal Sab1 is set at "0" in the normal situation, whereas abnormality occurrence signal Sab1 is set at "1" when an abnormality occurs in the control function of UVW-phase inverter control circuit 110. Similarly, XYZ-phase inverter control circuit 120 outputs an abnormality occurrence signal Sab2. Abnormality occurrence signal Sab2 is set at "0" in the normal situation, whereas abnormality occurrence signal Sab2 is set at "1" when an abnormality occur in the control function of XYZ-phase inverter control circuit 120.

Abnormality occurrence signals Sab1 and Sab2 show that a certain abnormality occurs in UVW-phase inverter control circuit 110 and XYZ-phase inverter control circuit 120, respectively, but do not contain any information about details of the abnormality. Thus, when at least one of abnormality occurrence signals Sab1 and Sab2 is set at "1", abnormality detection circuit 150 outputs an abnormality diagnosis instruction signal Sab to BIST controller 140 in order to specifically investigate the abnormality by the BIST.

Abnormality diagnosis instruction signal Sab is generated so as to instruct execution of a BIST for the control circuit having an abnormality, and includes a signal specifying a target for the BIST. In response to abnormality diagnosis instruction signal Sab, BIST controller 140 sets BIST instruction signal Sbs1 or Sbs2 at "1".

When both UVW-phase inverter control circuit 110 and XYZ-phase inverter control circuit 120 require the BIST, BIST instruction signals Sba1 and Sbs2 may be sequentially set at "1". However, in order to prevent the BIST from being simultaneously executed in both UVW-phase inverter control circuit 110 and XYZ-phase inverter control circuit 120, both BIST instruction signals Sbs1 and Sbs2 are not simultaneously set at "1".

Figure 7:
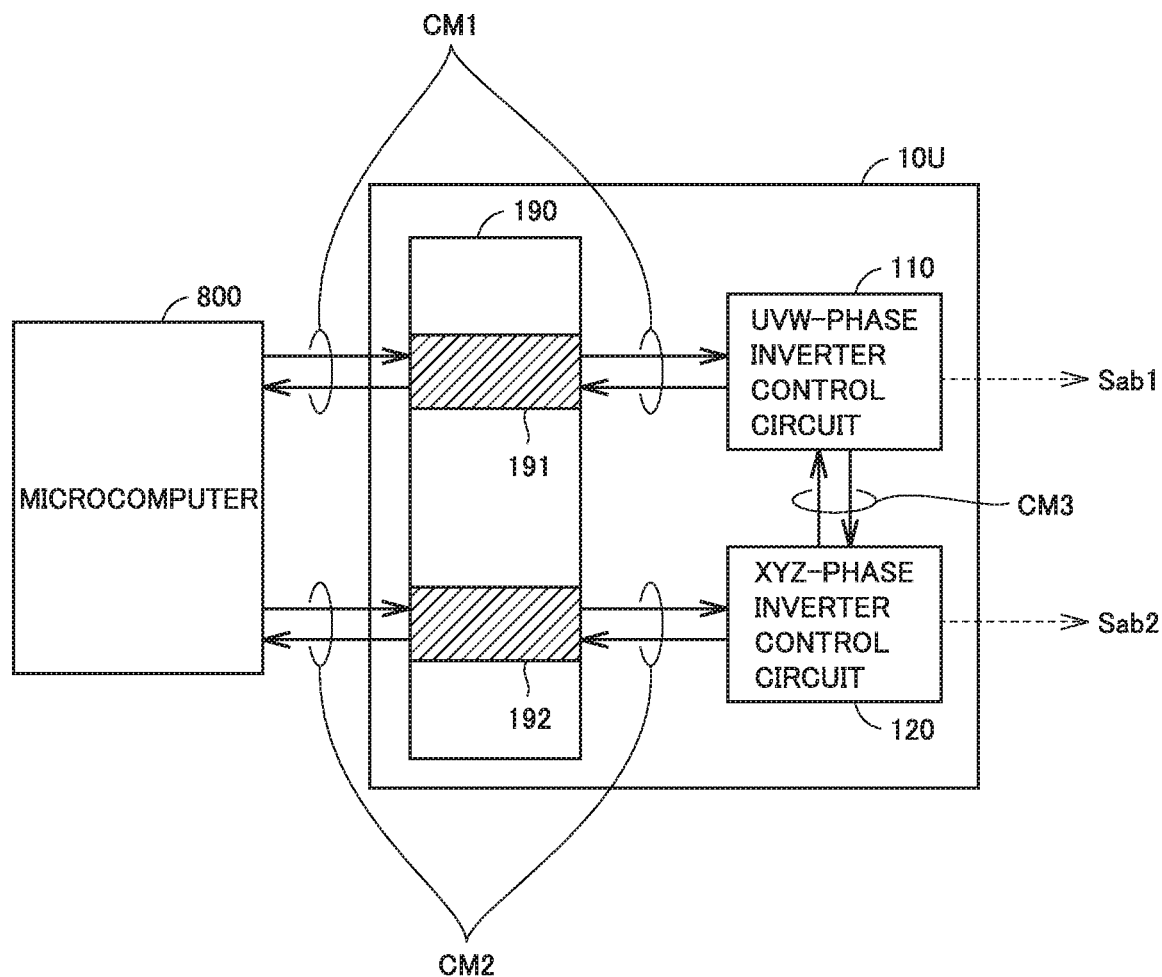
FIG. 7 is a functional block diagram for illustrating an example of abnormality detection by the UVW-phase inverter control circuit and an XYZ-phase inverter control circuit that are shown in FIG. 4.

FIG. 7 is a block diagram illustrating an example of abnormality detection by UVW-phase inverter control circuit 110 and XYZ-phase inverter control circuit 120.

Referring to FIG. 7, UVW-phase inverter control circuit 110 can detect an abnormality by handshake communication with a microcomputer 800 external to motor controller 100 through a path CM1 via a register 191 inside a memory 190 incorporated in motor controller 100.

Microcomputer 800 and UVW-phase inverter control circuit 110 operate in an alternating manner to write different values into register 191. For example, microcomputer 800 operates to write "1" after UVW-phase inverter control circuit 110 writes "0". In contrast, UVW-phase inverter control circuit 110 operates to write "0" after microcomputer 800 writes "1". In this case, when the value of register 191 is "1" during writing by microcomputer 800, or when the value of register 191 is "0" during writing by UVW-phase inverter control circuit 110, abnormality occurrence signal Sab1 can be set at "1".

Similarly, XYZ-phase inverter control circuit 120 also can detect an abnormality by handshake communication with microcomputer 800 through a path CM2 via a register 192 inside memory 190. In the state where microcomputer 800 and XYZ-phase inverter control circuit 120 operate in an alternating manner so as to write different values into register 192, and in the case where the value of register 192 is different from an intended value during writing by microcomputer 800 or XYZ-phase inverter control circuit 120, then, abnormality occurrence signal Sab2 can be set at "1".

Alternatively, abnormality occurrence signals Sab1 and Sab2 can be set at "1" also by handshake communication through a path CM3 between UVW-phase inverter control circuit 110 and XYZ-phase inverter control circuit 120. For example, the periodically computed control data values are exchanged between UVW-phase inverter control circuit 110 and XYZ-phase inverter control circuit 120. Then, when an abnormal change is detected in the data values between the periods, occurrence of an abnormality can be detected in one of UVW-phase inverter control circuit 110 and XYZ-phase inverter control circuit 120 communicating with each other.

Alternatively, UVW-phase inverter control circuit 110 or XYZ-phase inverter control circuit 120 computes a common control value (for example, the rotation angle of motor 700). Then, when there is a difference in computed values between UVW-phase inverter control circuit 110 and XYZ-phase inverter control circuit 120, occurrence of an abnormality can also be detected. In this case, however, it cannot be specified whether an abnormality occurs in UVW-phase inverter control circuit 110 or in XYZ-phase inverter control circuit 120. Thus, the BIST needs to be executed in both control circuits.

The description in FIG. 7 is merely an example. Based on any well-known methods, occurrence of an abnormality in UVW-phase inverter control circuit 110 and XYZ-phase inverter control circuit 120 can be detected, and abnormality occurrence signals Sab1 and Sab2 can be set at "1".

Again referring to FIG. 4, when BIST controller 140 sets BIST instruction signal Sbs1 or Sbs2 at "1" according to abnormality occurrence signal Sab1 or Sab2, one of UVW-phase inverter control circuit 110 and XYZ-phase inverter control circuit 120 executes the BIST. Thereby, generation of U-phase, V-phase and W-phase inverter control signals Su, Sv and Sw or generation of X-phase, Y-phase and Z-phase inverter control signals Sx, Sy and Sz is stopped.

On the other hand, each of U-phase, V-phase and W-phase inverter control signals Su, Sv and Sw and X-phase, Y-phase and Z-phase inverter control signals Sx, Sy and Sz is required for operating motor 700. Thus, during execution of the BIST, phase angle conversion unit 161 or 162 generates inverter control signals Su, Sv and Sw or inverter control signals Sx, Sy and Sz that are to be generated by a control circuit as a target for the BIST.

During execution of the BIST by UVW-phase inverter control circuit 110, phase angle conversion unit 161 generates U-phase, V-phase and W-phase inverter control signals Su #, Sv # and Sw # by phase conversion for X-phase, Y-phase and Z-phase inverter control signals Sx, Sy and Sz generated by XYZ-phase inverter control circuit 120. Specifically, phase differences corresponding to the respective angle differences between the UVW-phase winding group and the XYZ-phase winding group in motor 700 are applied to respective inverter control signals Sx, Sy and Sz, thereby generating inverter control signals Su #, Sv #, and Sw #. In the following description, inverter control signals Su, Sv and Sw generated by UVW-phase inverter control circuit 110 will be comprehensively referred to as an inverter control signal S1 while inverter control signals Su #, Sv #, and Sw # generated by phase angle conversion unit 161 will also be comprehensively referred to as an inverter control signal S1 #.

In contrast, during execution of the BIST by XYZ-phase inverter control circuit 120, phase angle conversion unit 162 performs phase conversion for applying the above-mentioned similar phase differences to U-phase, V-phase and W-phase inverter control signals Su, Sv and Sw generated by UVW-phase inverter control circuit 110, thereby generating X-phase, Y-phase and Z-phase inverter control signals Sx #, Sy #, and Sz #. In the following, similarly, inverter control signals Sx, Sy and Sz generated by XYZ-phase inverter control circuit 120 will be comprehensively referred to as an inverter control signal S2 while inverter control signals Sx, Sy and Sz generated by phase angle conversion unit 162 will also be comprehensively referred to as an inverter control signal S2 #.

Figure 8:
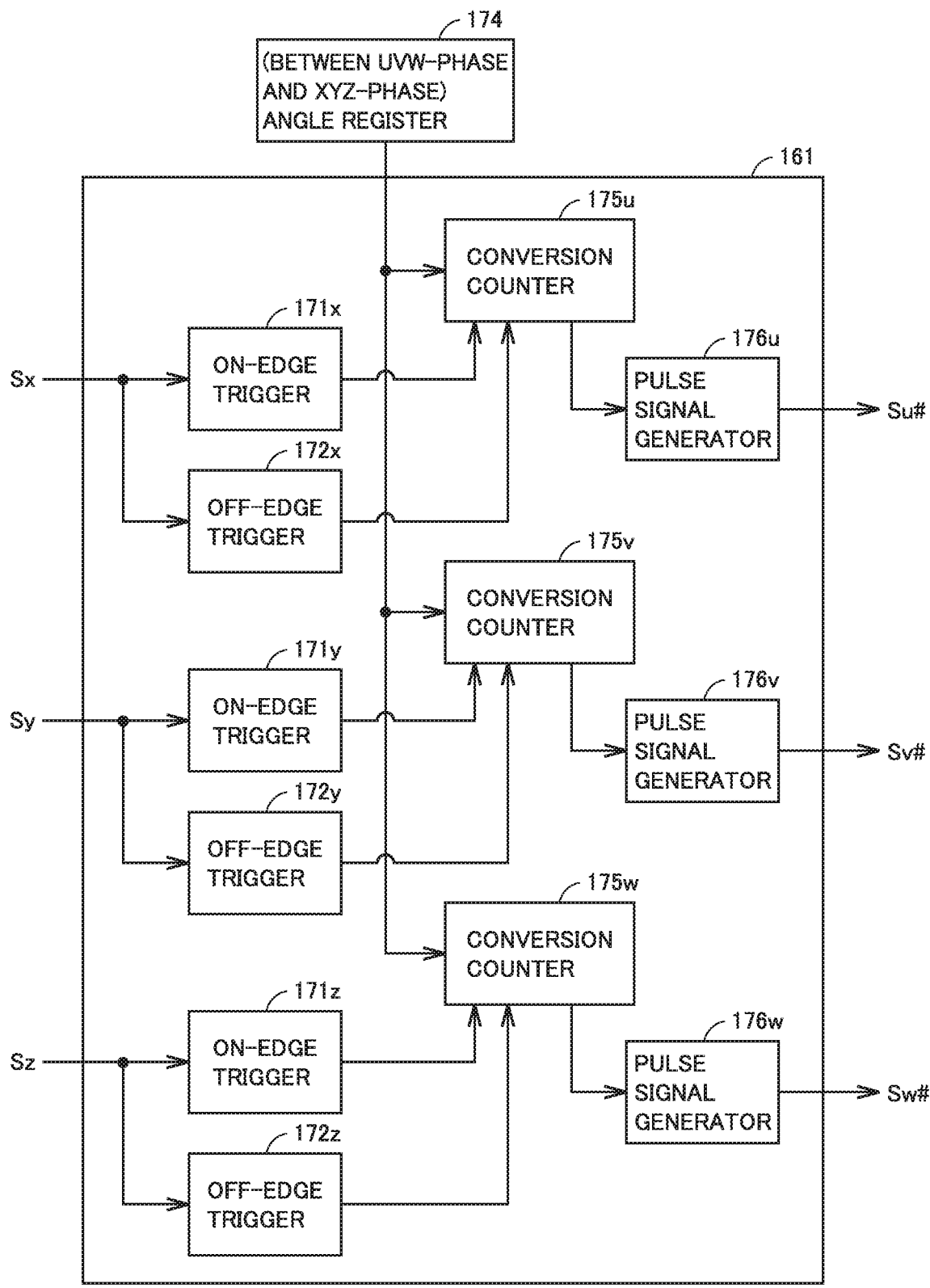
FIG. 8 is a functional block diagram illustrating a configuration example of a phase conversion unit shown in FIG. 4.
Figure 9:
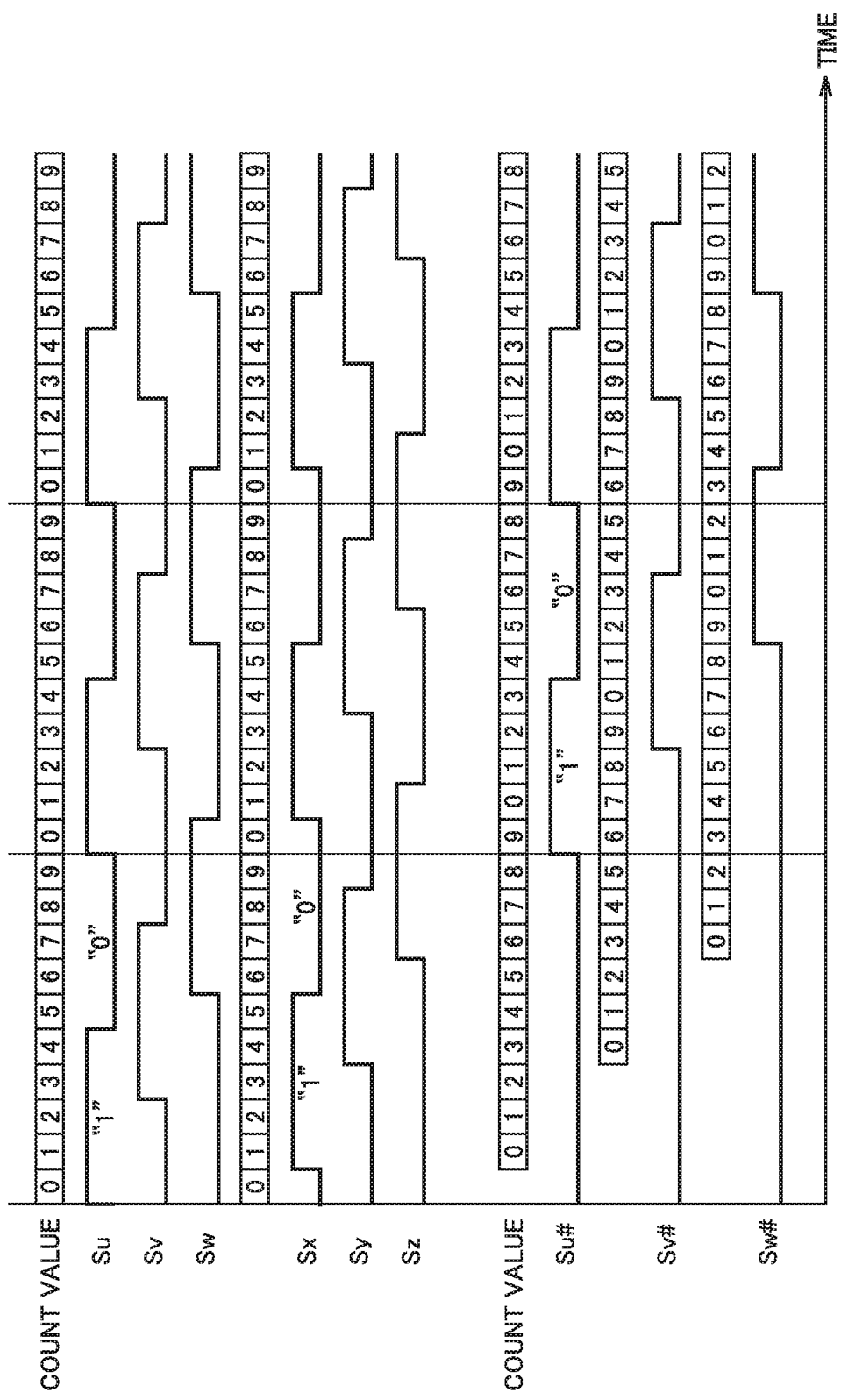
FIG. 9 is a waveform diagram illustrating an operation example of the phase conversion unit shown in FIG. 4.

FIG. 8 is a block diagram illustrating a configuration example of a phase angle conversion unit 161. FIG. 9 is a waveform diagram for illustrating an operation example of phase angle conversion unit 161.

Referring to FIG. 8, phase angle conversion unit 161 includes on-edge triggers 171x to 171z, off-edge triggers 172x to 172z, an angle register 174, conversion counters 175u to 175w, and pulse signal generators 176u to 176w.

On-edge trigger 171x and off-edge trigger 172x receive inverter control signal Sx. On-edge trigger 171y and off-edge trigger 172y receive inverter control signal Sy. On-edge trigger 171z and off-edge trigger 172z receive inverter control signal Sz. Pulse signal generators 176u, 176v and 176w generate inverter control signals Su #, Sv # and Sw #, respectively.

On-edge triggers 171x, 171y and 171z generate trigger pulses at respective transition timings (on-edge) from "0" to "1" of the received inverter control signals Sx, Sy and Sz. On the other hand, off-edge triggers 172x, 172y and 172z generate trigger pulses at respective transition timings (off-edge) from "1" to "0" of the received inverter control signals Sx, Sy and Sz.

Angle register 174 outputs, as register values, the data corresponding to the respective angle differences (phase differences) between the UVW-phase winding group and the XYZ-phase winding group. Conversion counters 175u, 175v and 175w each have a clocking function implemented by incrementing the count value in a constant count cycle.

Conversion counter 175u specifies the timings of the on-edge and the off-edge of inverter control signal Su # according to the count result in accordance with: the trigger pulses from on-edge trigger 171x and off-edge trigger 172x; and the register value from angle register 174. Pulse signal generator 176u generates inverter control signal Su # according to the timings of the on-edge and the off-edge specified by conversion counter 175u.

Similarly, conversion counter 175v specifies the timings of the on-edge and the off-edge of inverter control signal Sv # in accordance with: the trigger pulses from on-edge trigger 171y and off-edge trigger 172y; and the register value from angle register 174. Pulse signal generator 176v generates inverter control signal Sv # according to the timings of the on-edge and the off-edge specified by conversion counter 175v.

Furthermore, conversion counter 175w specifies the timings of the on-edge and the off-edge of inverter control signal Sw # in accordance with: the trigger pulses from on-edge trigger 171z and off-edge trigger 172z; and the register value from angle register 174. Pulse signal generator 176w generates inverter control signal Sw # according to the timings of the on-edge and the off-edge specified by conversion counter 175w.

As shown in FIG. 6, inverter control signals Sx, Sy and Sz are generated according to the voltage command value as a sinusoidal AC voltage having a period corresponding to the rotation speed of motor 700. During acceleration and deceleration of motor 700, the period of the voltage command value varies among the X-phase, the Y-phase and the Z-phase. On the other hand, during the operation of motor 700 at a constant speed, the period of the voltage command value is the same among the X-phase, the Y-phase and the Z-phase.

In the BIST for which phase angle conversion unit 161 or 162 is used, rotation speed command value Nref of motor 700 is fixed at a prescribed value (Nref=Nbs). Thereby, the count numbers corresponding to the angle differences between the UVW-phase winding group and the XYZ-phase winding group are also fixed with respect to the respective count cycles by conversion counters 175u, 175v and 175w. Thus, the above-mentioned count number at rotation speed Nbs during the BIST is stored in angle register 174 in advance.

FIG. 9 shows a waveform example in the case where motor 700 is controlled at constant speed Nbs. Each of inverter control signals Su, Sv, Sw and Sx, Sy, Sz are assumed to have the same PWM pulse width in one period of each carrier wave ("1" period length) for simplifying the description.

In each of inverter control signals Su, Sv, and Sy, one period of the carrier wave corresponds to count number 10. Thus, on condition that count values 0 to 9 periodically change, a PWM pulse is generated each time the count value=0. Inverter control signals Sy and Sz each have a phase difference of 120 degrees with respect to inverter control signal Sx.

Inverter control signals Sx, Sy and Sz have phase differences corresponding to the angle differences between the UVW-phase winding group and the XYZ-phase winding group with respect to respective inverter control signals Su, Sv and Sw. In the example in FIG. 9, the phase difference in one period of each carrier wave corresponds to count number 1. In other words, inverter control signals Sx, Sy and Sz can be obtained by phase conversion for delaying the phase by count number 1 from inverter control signals Su, Sv and Sw, respectively. In contrast, inverter control signals Su, Sv and Sw can be obtained by phase conversion for advancing the phase by count number 1 from inverter control signals Sx, Sy and Sz, respectively. Thus, angle register 174 stores count number=1 as a register value.

Phase angle conversion unit 161 generates inverter control signals Su #, Sv #, and Sw # by phase conversion for advancing the phases of X-phase, Y-phase and Z-phase inverter control signals Sx, Sy and Sz by count number 1 (or for delaying, by count number 9, the phases of inverter control signals Sx, Sy and Sz in the period preceding thereto by one period). As understood from FIG. 9, inverter control signals Su, Sv, Sw are identical in phase to inverter control signals Su #, Sv #, and Sw #, respectively.

Accordingly, even if UVW-phase inverter control circuit 110 stops generation of inverter control signals Su, Sv and Sw during execution of the BIST, U-phase, V-phase and W-phase inverter control signals Su #, Sv #, and Sw # can be generated by phase angle conversion unit 161 from inverter control signals Sx, Sy and Sz, respectively, generated by XYZ-phase inverter control circuit 120.

Similarly, phase angle conversion unit 162 can generate inverter control signals Sx #, Sy #, and Sz # by phase conversion for delaying the phases of U-phase, V-phase and W-phase inverter control signals Su, Sv and Sw, respectively, by count number 1. Thus, even if XYZ-phase inverter control circuit 120 stops generation of inverter control signals Sx, Sy and Sz during execution of the BIST, X-phase, Y-phase and Z-phase inverter control signals Sx #, Sy #, and Sz # can be generated by phase angle conversion unit 162 from inverter control signals Su, Sv and Sw, respectively, generated by UVW-phase inverter control circuit 110.

Again referring to FIG. 4, on its "0" side, selector 171 receives inverter control signal S1 (Sx, Sy, Sz) from UVW-phase inverter control circuit 110. Also, on its "1" side, selector 171 receives inverter control signal S1 # (Su #, Sv #, Sw #) from phase angle conversion unit 161. The output of selector 171 is switched according to a selector control signal Ssl1 from BIST controller 140.

On the condition that Ssl1="0", selector 171 outputs inverter control signal S1 received on its "0" side to pre-driver 300 as inverter control signals Su, Sv and Sw. On the condition that Ssl1="1", selector 171 outputs inverter control signal S1 # received on its "1" side to pre-driver 300 as inverter control signals Su, Sv and Sw.

Similarly, on its "0" side, selector 172 receives inverter control signal S2 (Sx, Sy, Sz) from XYZ-phase inverter control circuit 120. Also, on its "1" side, selector 172 receives inverter control signal S2 # (Sx #, Sy #, Sz #) from phase angle conversion unit 162. The output of selector 172 is switched according to selector control signal Ssl2 from BIST controller 140.

On the condition that Ssl2="0", selector 172 outputs inverter control signal S2 received on its "0" side to pre-driver 300 as inverter control signals Sx, Sy and Sz. On the condition that Ssl2="1", selector 172 outputs inverter control signal S2 # received on its "1" side to pre-driver 300 as inverter control signals Sx, Sy and Sz.

FIG. 10 shows a table for illustrating operations of selectors 171 and 172 in the motor controller according to the first embodiment.

Referring to FIGS. 10 and 4, during the normal operation in which the BIST is not executed in both UVW-phase inverter control circuit 110 and XYZ-phase inverter control circuit 120 (that is, when an abnormality diagnosis is not conducted), BIST instruction signals are set such that Sbs1=Sbs2="0", and selector control signals are set such that Ssl1=Ssl2="0". Thus, selector 171 outputs inverter control signal S1 generated by UVW-phase inverter control circuit 110 to pre-driver 300 as U-phase, V-phase and W-phase inverter control signals Su, Sv and Sw. On the other hand, selector 172 outputs inverter control signal S2 generated by XYZ-phase inverter control circuit 120 to pre-driver 300 as X-phase, Y-phase and Z-phase inverter control signals Sx, Sy and Sz. In this way, motor 700 can be operated by supplying both the U-phase, V-phase and W-phase inverter control signals and the X-phase, Y-phase and Z-phase inverter control signals.

During execution of the BIST by UVW-phase inverter control circuit 110, BIST instruction signals are set such that Sbs1="1" and Sbs2="0". Furthermore, selector control signals are set such that Ssl1="1" and Ssl2="0". Thus, selector 171 outputs inverter control signal S1 # from phase angle conversion unit 161 to pre-driver 300 as U-phase, V-phase and W-phase inverter control signals Su, Sv and Sw. On the other hand, selector 172 outputs inverter control signal S2 generated by XYZ-phase inverter control circuit 120 to pre-driver 300 as X-phase, Y-phase and Z-phase inverter control signals Sx, Sy and Sz.

As a result, even if UVW-phase inverter control circuit 110 stops its control function by execution of the BIST, the U-phase, V-phase and W-phase inverter control signals can be supplied to pre-driver 300 by phase angle conversion unit 161 and selector 171.

During execution of the BIST by XYZ-phase inverter control circuit 120, BIST instruction signals are set such that Sbs1="0" and Sbs2="1". Furthermore, selector control signals are set such that Ssl1="0" and Ssl2="1". Thus, selector 171 outputs inverter control signal S1 generated by UVW-phase inverter control circuit 110 to pre-driver 300 as U-phase, V-phase and W-phase inverter control signals Su, Sv and Sw. On the other hand, selector 172 outputs inverter control signal S2 # (Sx #, Sy #, Sz #) from phase angle conversion unit 162 to pre-driver 300 as X-phase, Y-phase and Z-phase inverter control signals Sx, Sy and Sz.

As a result, even if XYZ-phase inverter control circuit 120 stops its control function by execution of the BIST, the X-phase, Y-phase and Z-phase inverter control signals can be supplied to pre-driver 300 by phase angle conversion unit 162 and selector 172.

In this way, even when the BIST is executed in one control circuit of UVW-phase inverter control circuit 110 and XYZ-phase inverter control circuit 120, both the U-phase, V-phase and W-phase inverter control signals and the X-phase, Y-phase and Z-phase inverter control signals can be generated similarly to the case where an abnormality diagnosis is not conducted. As a result, even if the BIST is executed in UVW-phase inverter control circuit 110 or XYZ-phase inverter control circuit 120, the operation of motor 700 can be continued.

In other words, in the first embodiment, phase angle conversion units 161, 162 and selectors 171, 172 can configure the "control signal supply circuit". Furthermore, phase angle conversion units 161, 162 correspond to the "signal conversion circuit", selector 171 corresponds to the "first signal selection circuit", and selector 172 corresponds to the "second signal selection circuit".

As described above, according to the motor controller in the first embodiment, in the configuration in which motor 700 is controlled by two inverter control circuits (UVW-phase inverter control circuit 110 and XYZ-phase inverter control circuit 120) having different control functions, even when the BIST is executed in one inverter control circuit, but when the inverter control signal from the other inverter control circuit is converted, an inverter control signal to be generated by the inverter control circuit that is currently executing the BIST can be alternatively generated.

As a result, the same control function does not have to be multiplexed, but the operation of motor 700 is maintained, with the result that an abnormality self-diagnosis of the inverter control circuit can be conducted without stopping motor system 10*a*.

Second Embodiment

Figure 11:
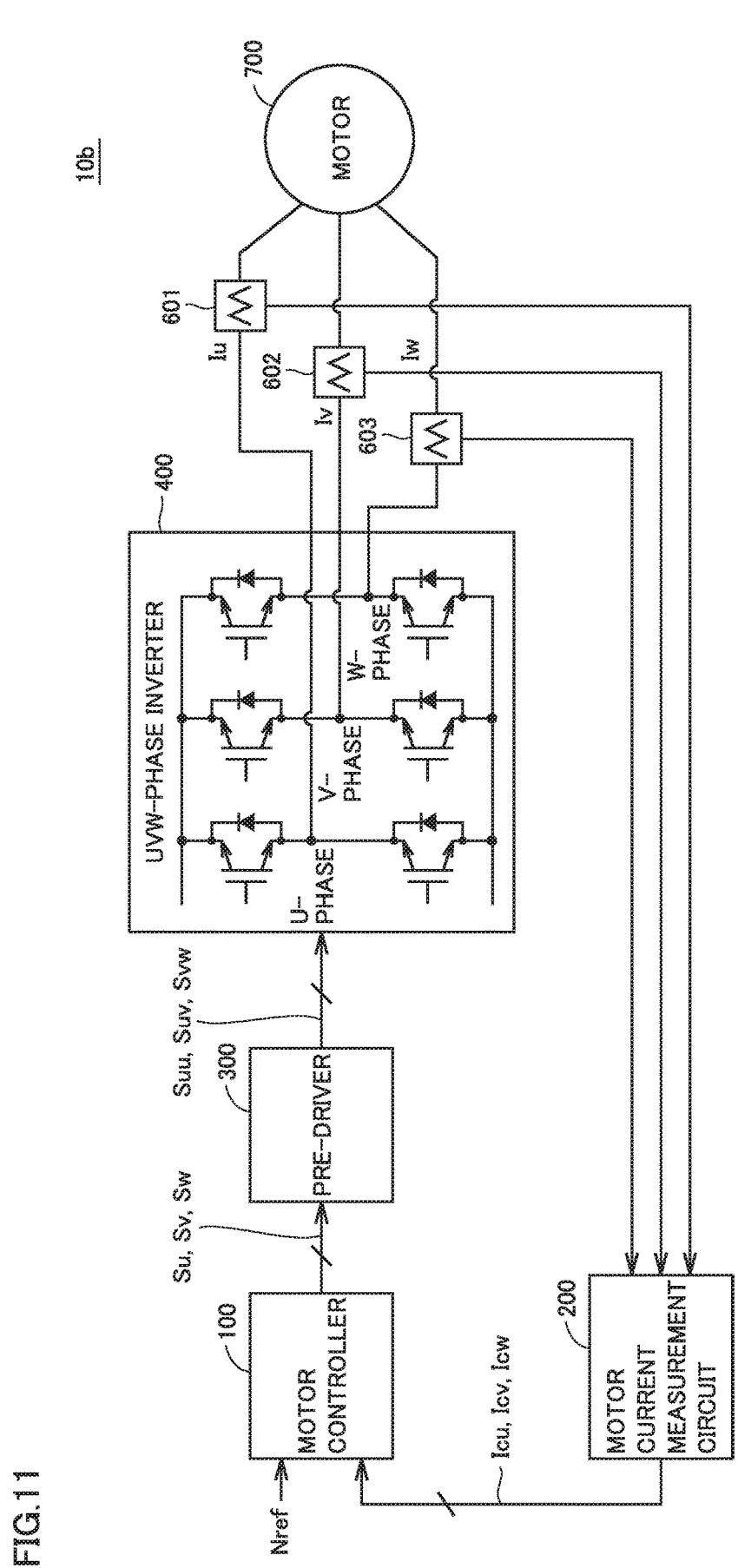
FIG. 11 is a block diagram showing the schematic configuration of a motor system controlled by a motor controller according to the second embodiment.

FIG. 11 is a block diagram showing the schematic configuration of a motor system 10*b* controlled by a motor controller according to the second embodiment.

Referring to FIG. 11, in the second embodiment, motor 700 includes only a UVW-phase winding group among the UVW-phase winding group and the XYZ-phase winding group shown in FIG. 1. The U-phase winding, the V-phase winding and the W-phase winding are different in arrangement angle by 120 degrees from one another as in the first embodiment. In the manner corresponding thereto, in the motor control system according to the second embodiment, XYZ-phase inverter 500 shown in FIG. 2 is not disposed but only UVW-phase inverter 400 is disposed.

Thus, motor 700 is provided with a U-phase current detector 601, a V-phase current detector 602, and a W-phase current detector 603. Motor current measurement circuit 200 generates U-phase, V-phase and W-phase inverter on/off determination signals Icu, Icv, and Icw based on the detection values by current detectors 601, 602 and 603, respectively.

Motor controller 100 generates inverter control signals Su, Sv and Sw in respective phases for controlling, according to rotation speed command value Nref, the rotation speed of motor 700 detected by inverter on/off determination signals Icu, Icv, and Icw, respectively. Inverter control signals Su, Sv and Sw correspond to the on-off control signals for the semiconductor switching elements in respective phases of UVW-phase inverter 400 for controlling the voltage applied from UVW-phase inverter 400 to the U-phase winding, the V-phase winding, and the W-phase winding, respectively.

In the second embodiment, motor controller 100 generates inverter control signals Su, Sv and Sw in respective phases for controlling, according to rotation speed command value Nref, the rotation speed of motor 700 detected by U-phase, V-phase and W-phase inverter on/off determination signals Icu, Icv and Icw, respectively. Inverter control signals Su, Sv and Sw correspond to the on-off control signals for the semiconductor switching elements in respective phases of UVW-phase inverter 400 for controlling the voltage applied from UVW-phase inverter 400 to U-phase winding 731, V-phase winding 732, and W-phase winding 733, respectively.

As in the first embodiment, in response to U-phase, V-phase and W-phase inverter control signals Su, Sv and Sw, pre-driver 300 generates a drive control signal for the semiconductor switching elements in the upper arm and the lower arm in each of the phases of UVW-phase inverter 400. In this way, in motor system 10b according to the second embodiment, motor 700 is controlled only by a single UVW-phase inverter in contrast to the first embodiment in which two inverters, that is, a UVW-phase inverter and an XYZ-phase inverter are disposed.

Figure 12:
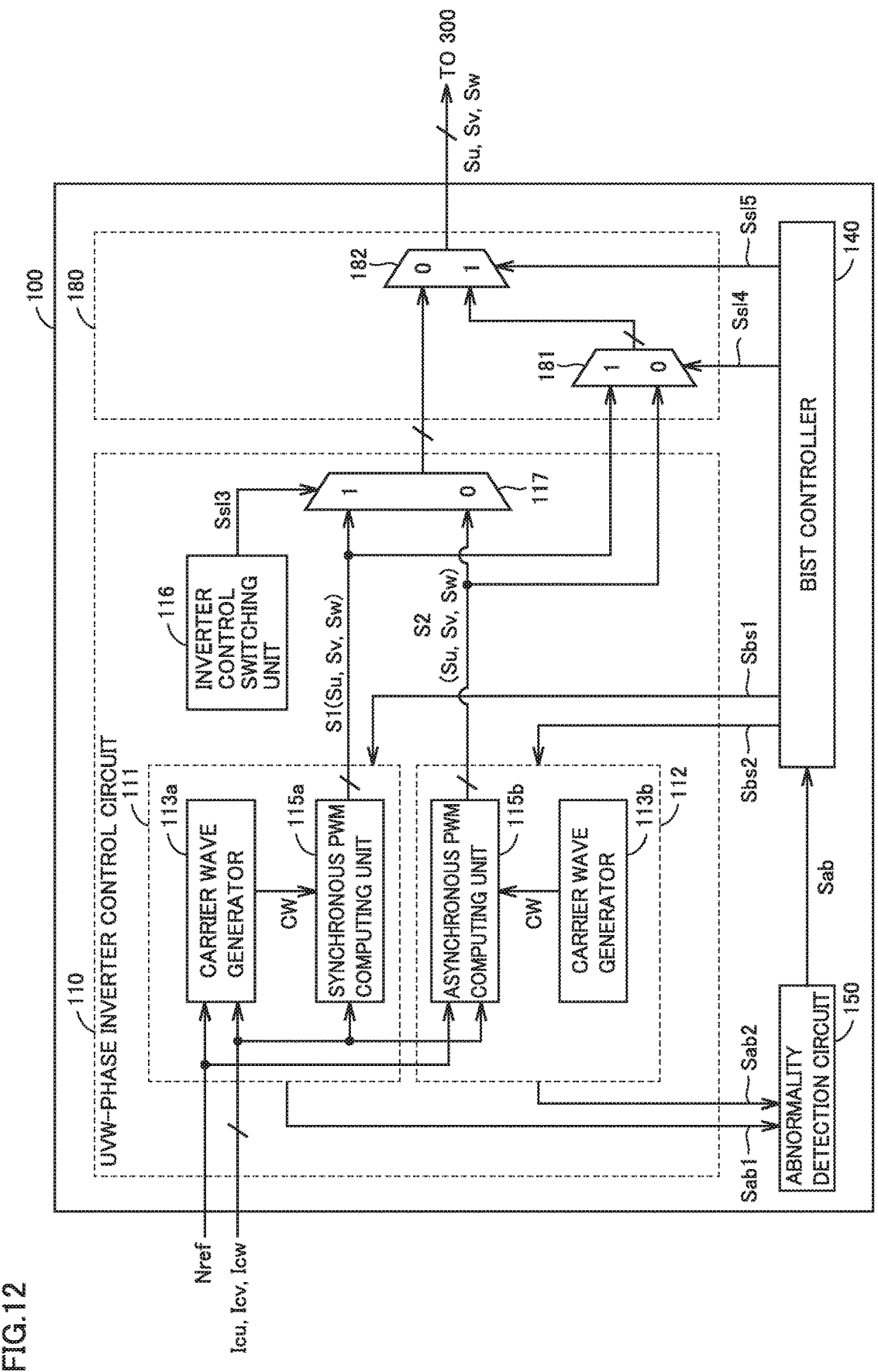
FIG. 12 is a functional block diagram for illustrating the configuration of the motor controller according to the second embodiment.

FIG. 12 is a functional block diagram for further illustrating the configuration of the motor controller according to the second embodiment.

Referring to FIG. 12, motor controller 100 includes a UVW-phase inverter control circuit 110, a BIST controller 140, an abnormality detection circuit 150, and a BIST selector 180. UVW-phase inverter control circuit 110 includes a synchronous PWM control unit 111, an asynchronous PWM control unit 112, an inverter control switching unit 116, and a selector 117.

Synchronous PWM control unit 111 includes a carrier wave generator 113a and a synchronous PWM computing unit 115a. Similarly, asynchronous PWM control unit 112 includes a carrier wave generator 113b and an asynchronous PWM computing unit 115b.

In synchronous PWM control unit 111, carrier wave generator 113a generates a carrier wave CW so as to have a frequency that is an integral multiple of the rotation frequency of motor 700 that is detected by rotation speed command value Nref or inverter on/off determination signals Icu, Icv, and Icw. In other words, the frequency of carrier wave CW generated by carrier wave generator 113a changes in accordance with the rotation speed (rotation frequency) of motor 700. On the other hand, in asynchronous PWM control unit 112, carrier wave generator 113b generates a carrier wave CW having a fixed constant frequency. In FIG. 12, U-phase, V-phase and W-phase carrier waves CWu, CWv, and CWw shown in FIG. 5 are comprehensively denoted as carrier wave CW.

Each of synchronous PWM computing unit 115a and asynchronous PWM computing unit 115b has functions of voltage command computing unit 114 and PWM computing unit 115 shown in FIG. 5. In other words, synchronous PWM computing unit 115a has a control function (the first control function) of generating inverter control signals Su, Sv and Sw by synchronous PWM control that is performed using carrier wave CW having a variable frequency. On the other hand, asynchronous PWM computing unit 115b has a control function (the second control function) of generating inverter control signals Su, Sv and Sw by asynchronous PWM control performed using carrier wave CW having a fixed frequency.

In this way, synchronous PWM control unit 111 and asynchronous PWM control unit 112 each generate inverter control signals Su, Sv and Sw, but have different control functions. In the following description, inverter control signals Su, Sv and Sw generated by synchronous PWM control unit 111 will be also comprehensively referred to as an inverter control signal S1 while inverter control signals Su, Sv and Sw generated by asynchronous PWM control unit 112 will be also comprehensively referred to as an inverter control signal S2.

Specifically, in the second embodiment, synchronous PWM control unit 111 corresponds to one example of the "first control circuit", and inverter control signal S1 corresponds to the "first control signal". Also, asynchronous PWM control unit 112 corresponds to one example of the "second control circuit", and inverter control signal S2 corresponds to the "second control signal". Also in the second embodiment, BIST controller 140 corresponds to one example of the "self-diagnosis control circuit".

Motor 700 can be operated when one of synchronous PWM control unit 111 and asynchronous PWM control unit 112 generates inverter control signals Su, Sv and Sw. Thus, in the motor controller according to the second embodiment, selector 117 is disposed for selectively producing an output from one of synchronous PWM control unit 111 and asynchronous PWM control unit 112 to pre-driver 300.

On its "1" side, selector 117 receives inverter control signal S1 (Su, Sv, Sw) generated by synchronous PWM control unit 111. On its "0" side, selector 117 receives inverter control signal S2 (Su, Sv, Sw) generated by asynchronous PWM control unit 112.

Inverter control switching unit 116 outputs a selector control signal Ssl3. Selector control signal Ssl3 may be fixed at each motor system 10b in accordance with the usage and the like of motor 700 or may be switched by inverter control switching unit 116 in accordance with the operating state (for example, the rotation speed region) of motor 700.

On the condition that Ssl3="1", selector 117 outputs inverter control signal S1 from synchronous PWM control unit 111 as inverter control signals Su, Sv and Sw to pre-driver 300. On the other hand, on the condition that Ssl1="0", selector 117 outputs inverter control signal S2 from asynchronous PWM control unit 112 as inverter control signals Su, Sv and Sw to pre-driver 300.

In this way, in motor system 10b controlled by the motor controller according to the second embodiment, motor 700 can be controlled by selecting one of the synchronous PWM control function and the asynchronous PWM control function by selector control signal Ssl3 from inverter control switching unit 116.

In the following description, among synchronous PWM control unit 111 and asynchronous PWM control unit 112, one control unit selected by inverter control switching unit 116 at the start of an abnormality diagnosis will also be referred to as a "drive system" while the other control unit not selected by inverter control switching unit 116 will also be referred to as a "non-drive system". For example, on the condition that selector control signal Ssl3="1" at the time when abnormality diagnosis instruction signal Sab is generated, synchronous PWM control unit 111 serves as a drive system while asynchronous PWM control unit 112 serves as a non-drive system.

Also in the motor controller according to the second embodiment, abnormality detection circuit 150 and BIST controller 140 have the same functions as those in the first embodiment. Furthermore, synchronous PWM control unit 111 and asynchronous PWM control unit 112 can generate abnormality occurrence signal Sab1 and abnormality occurrence signal Sab2, respectively, as in UVW-phase inverter control circuit 110 and XYZ-phase inverter control circuit 120 in the first embodiment. Specifically, when an abnormality occurs in the control function of synchronous PWM control unit 111, abnormality occurrence signal Sab1 is set at "1". Furthermore, when an abnormality occurs in the control function of asynchronous PWM control unit 112, abnormality occurrence signal Sab2 is set at "1".

Based on abnormality occurrence signals Sab1 and Sab2, abnormality detection circuit 150 generates abnormality diagnosis instruction signal Sab as in the first embodiment.

When BIST controller 140 instructs synchronous PWM control unit 111 to execute the BIST according to abnormality diagnosis instruction signal Sab, BIST controller 140 sets BIST instruction signal Sbs1 at "1". On the other hand, when BIST controller 140 instructs asynchronous PWM control unit 112 to execute the BIST, BIST controller 140 sets BIST instruction signal Sbs2 at "1". As in the first embodiment, both BIST instruction signals Sbs1 and Bbs2 are not simultaneously set at "1".

BIST selector 180 includes selectors 181 and 182 provided for an abnormality diagnosis for selector 117 provided in the second embodiment. BIST controller 140 generates a selector control signal Ssl4 and a selector control signal Ssl5. Selector control signal Ssl4 controls the output from selector 181. Selector control signal Ssl5 controls the output from selector 182.

Selector 181 has an input side similar to that of selector 117. On its "1" side, selector 181 receives inverter control signal S1 from synchronous PWM control unit 111. On its "0" side, selector 181 receives inverter control signal S2 from asynchronous PWM control unit 112. The output signal from selector 181 is switched by selector control signal Ssl4. In other words, selector 181 has the same function as that of selector 117 achieved by switching selector control signal Ssl4 between "0" and "1".

On its "0" side, selector 182 receives the output signal from selector 117. On its "1" side, selector 182 receives the output signal from selector 181. On the condition that selector control signal Ssl5="0", selector 182 outputs inverter control signals Su Sv, and Sw from selector 117 to pre-driver 300. In contrast, on the condition that selector control signal Ssl5="1", selector 182 outputs inverter control signals Su, Sv and Sw from selector 181 to pre-driver 300.

When an abnormality diagnosis is not conducted (in the normal operation), BIST controller 140 sets selector control signal Ssl5 at "0". As a result, motor 700 is controlled by inverter control signals Su, Sv and Sw from one (drive system) of the synchronous PWM and the asynchronous PWM that is selected by inverter control switching unit 116 (selector control signal Ssl3).

In contrast, BIST controller 140 sets selector control signal Ssl5 at "1". Thereby, even when the signal path by selector 117 is determined not to be used due to an abnormality diagnosis (BIST), the path for transmission of inverter control signals Su, Sv and Sw to pre-driver 300 can be ensured. In this case, it can be selected by selector control signal Ssl4 whether motor 700 is to be operated by synchronous PWM control unit 111 or asynchronous PWM control unit 112.

Then, the control process performed when conducting an abnormality diagnosis in the motor controller according to the second embodiment will be described with reference to the flowcharts in FIGS. 13 to 15. The control process shown in FIGS. 13 to 15 can be performed by BIST controller 140. As described above, before conducting an abnormality diagnosis, selector control signal Ssl5 is set at "0". In addition, according to selector control signal Ssl3, one of synchronous PWM control unit 111 and asynchronous PWM control unit 112 is set as a drive system and the other one is set as a non-drive system.

Figure 13:
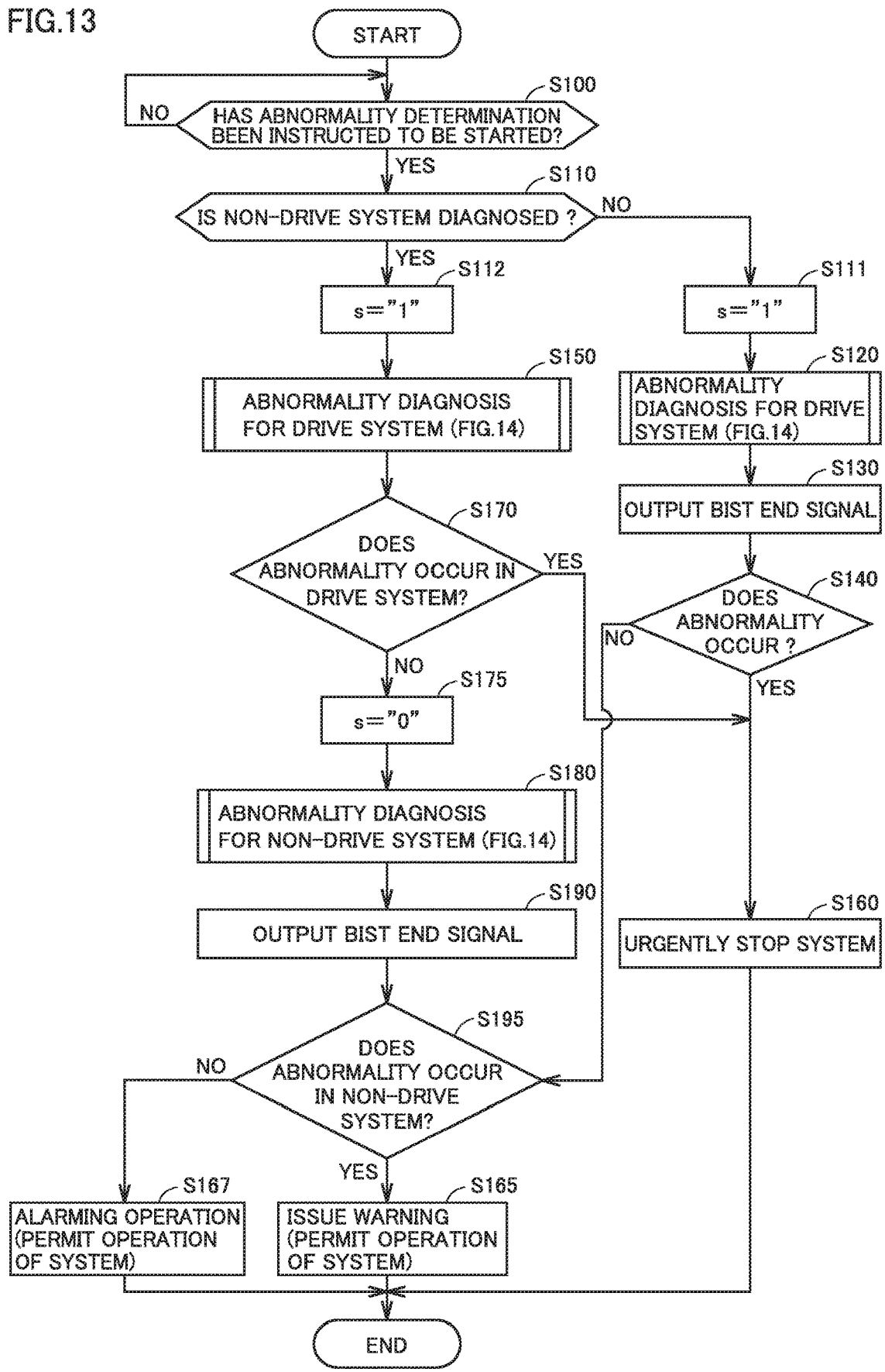
FIG. 13 is the first flowchart illustrating a control process of an abnormality diagnosis by the motor controller according to the second embodiment.

Referring to FIG. 13, BIST controller 140 determines in step S100 whether starting of an abnormality diagnosis has been instructed or not. For example, while abnormality diagnosis instruction signal Sab="0", it is determined as NO in step S100. When abnormality diagnosis instruction signal Sab changes from "0" to "1", it is determined as YES in step S100.

When starting of an abnormality diagnosis is instructed (when it is determined as YES in S100), BIST controller 140 determines in step S110 whether the non-drive system is also set as a target for diagnosis or not. The determination in step S110 can be made, for example, by referring to the register value stored in advance. This register value is set in order to distinguish whether an abnormality diagnosis is conducted only for the drive system or for both the drive system and the non-drive system.

First, the following is an explanation about the case where an abnormality diagnosis is conducted only for the drive system (when it is determined as NO in S110). BIST controller 140 sets a flag s at "1" in step S111, and thereafter, conducts an abnormality diagnosis for the drive system in step S120.

Flag s is a 1-bit value that is set at "1" in the abnormality diagnosis for the drive system, and that is set at "0" in the abnormality diagnosis for the non-drive system. In step S120 (FIG. 13), the control process shown in FIG. 14 is performed.

Figure 14:
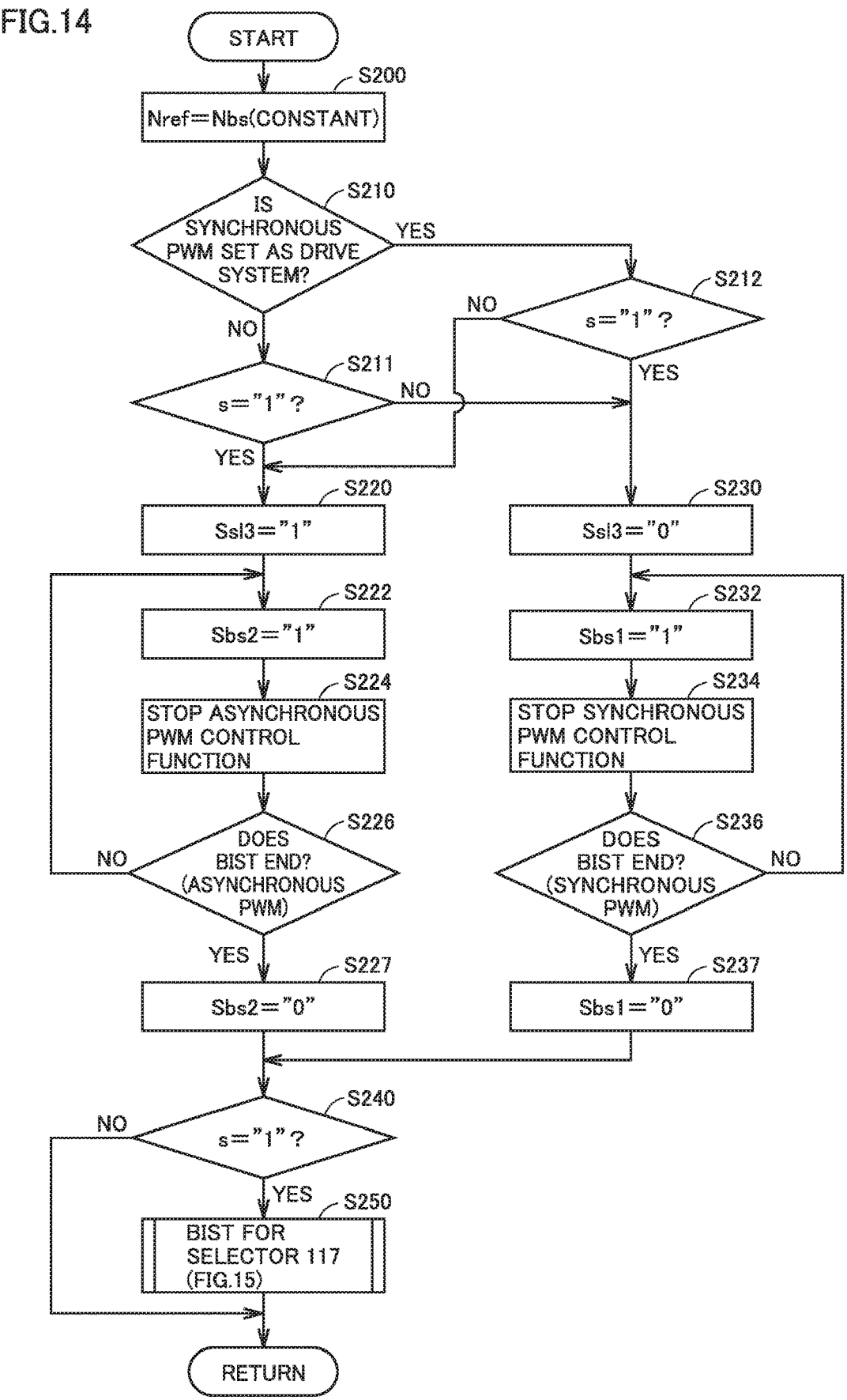
FIG. 14 is the second flowchart illustrating the control process of the abnormality diagnosis by the motor controller according to the second embodiment.

Referring to FIG. 14, in step S200, BIST controller 140 sets rotation speed command value Nref for motor 700 at Nbs (a constant value) (Nref=Nbs). It is preferable to maintain Nref=Nbs until generation of the BIST end signal, which will be described later.

BIST controller 140 determines in step S210 whether synchronous PWM is set as a drive system or not. For example, the determination in step S210 can be made based on selector control signal Ssl3 at the start of the abnormality diagnosis. Furthermore, the value of flag s is checked in steps S211 and S212.

When the synchronous PWM is set as a drive system, it is determined as YES in each of steps S210 and S212, and then, the process proceeds to step S230 in order to execute the BIST in synchronous PWM control unit 111.

In step S230, BIST controller 140 sets selector control signal Ssl3 at "0". Furthermore, in step S232, BIST controller 140 sets BIST instruction signal Sbs1 at "1". Thereby, in step S234, synchronous PWM control unit 111 executes the BIST to thereby stop the synchronous PWM control function. On the other hand, asynchronous PWM control unit 112 not executing the BIST generates inverter control signal S2.

Until the BIST by synchronous PWM control unit 111 ends (when it is determined as NO in S236), BIST instruction signal Sbs1 is maintained at "1" (S232), and the state where the synchronous PWM control function is stopped is continued (S234). On the other hand, during execution of the BIST by synchronous PWM control unit 111, selector control signal Ssl3 is set at "0" (S230), so that inverter control signal S2 from asynchronous PWM control unit 112 is output from selector 117 and transmitted to pre-driver 300.

When the BIST by synchronous PWM control unit 111 ends (when it is determined as YES in S236), BIST controller 140 sets BIST instruction signal Sbs1 at "0" in step S237. Thereby, the BIST by synchronous PWM control unit 111 ends.

On the other hand, when the asynchronous PWM is set as a drive system, it is determined as NO in step S210, and determined as YES in step S211. Then, the process proceeds to step S220 in order to execute the BIST in asynchronous PWM control unit 112.

In step S220, BIST controller 140 sets selector control signal Ssl3 at "1". Furthermore, in step S222, BIST controller 140 sets BIST instruction signal Sbs2 at "1". Thereby, in step S224, asynchronous PWM control unit 112 executes the BIST to thereby stop the asynchronous PWM control function. On the other hand, synchronous PWM control unit 111 not executing the BIST generates inverter control signal S1.

Until the BIST by asynchronous PWM control unit 112 ends (when it is determined as NO in S226), BIST instruction signal Sbs2 is maintained at "1" (S222), and the state where the asynchronous PWM control function is stopped (S224) is continued. However, during execution of the BIST by asynchronous PWM control unit 112, selector control signal Ssl3 is set at "1" (S220). Thus, inverter control signal S1 from synchronous PWM control unit 111 is output from selector 117 and transmitted to pre-driver 300.

In this way, also during execution of the BIST by synchronous PWM control unit 111 or asynchronous PWM control unit 112, inverter control signals Su, Sv and Sw equivalent to those applied when not executing the abnormality diagnosis can be supplied to pre-driver 300. As a result, motor 700 can be continuously operated also during the abnormality diagnosis by the BIST.

When the BIST by asynchronous PWM control unit 112 ends (when it is determined as YES in S226), BIST controller 140 sets BIST instruction signal Sbs2 at "0" in step S227. Thereby, the BIST by asynchronous PWM control unit 112 ends.

When the BIST by synchronous PWM control unit 111 or asynchronous PWM control unit 112 ends (S227, S237), then in step S240, BIST controller 140 determines based on the value of flag s whether the BIST for selector 117 needs to be executed or not.

Figure 15:
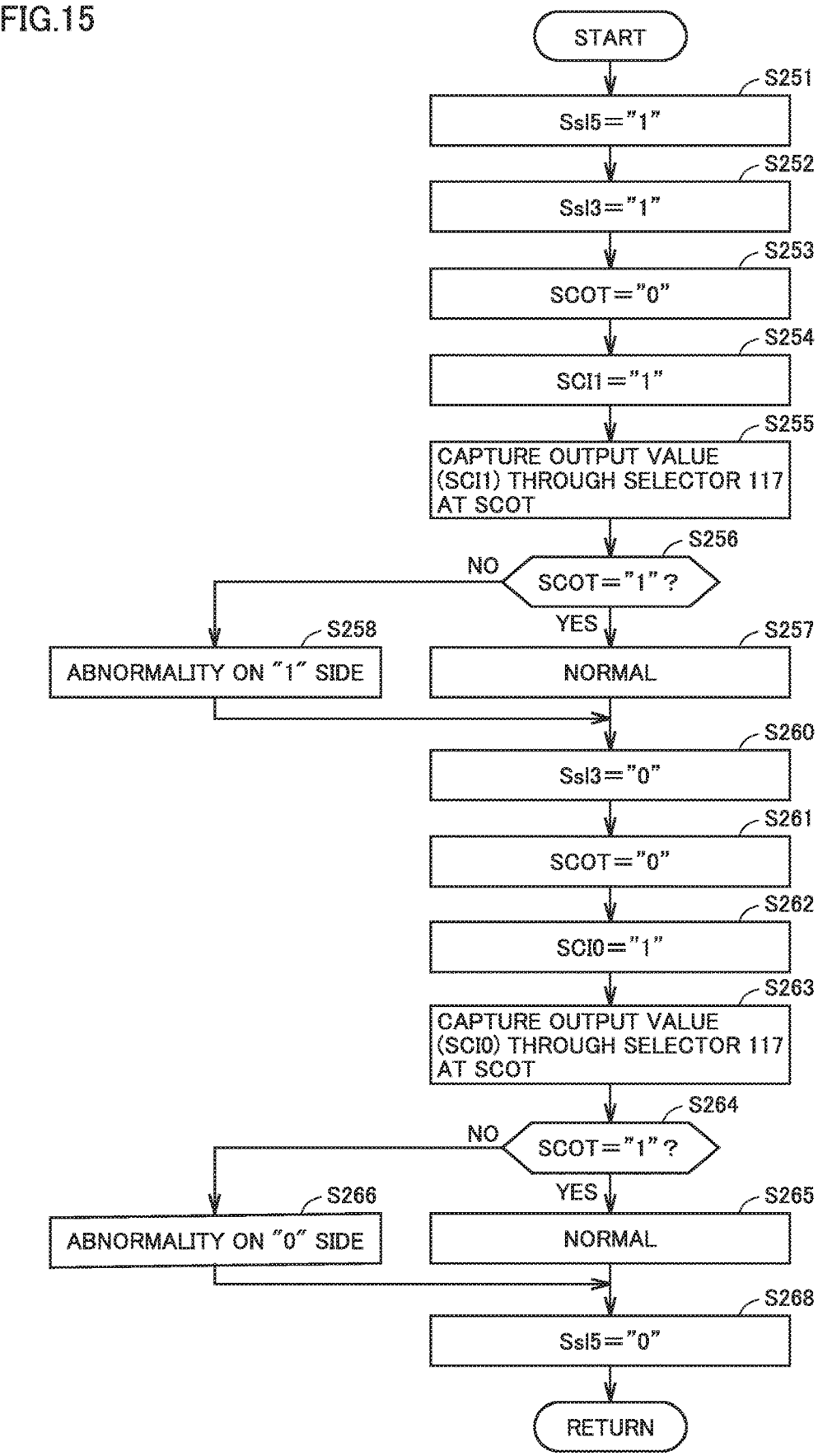
FIG. 15 is the third flowchart illustrating the control process of the abnormality diagnosis by the motor controller according to the second embodiment.

When s="1" (when it is determined as YES in S240), then in step S250, BIST controller 140 executes the BIST for selector 117 by the control process shown in FIG. 15. On the other hand, when s="0" (when it is determined as NO in S240), execution of the BIST in step S250 is skipped, and the control process in FIG. 14 ends.

Figure 16:
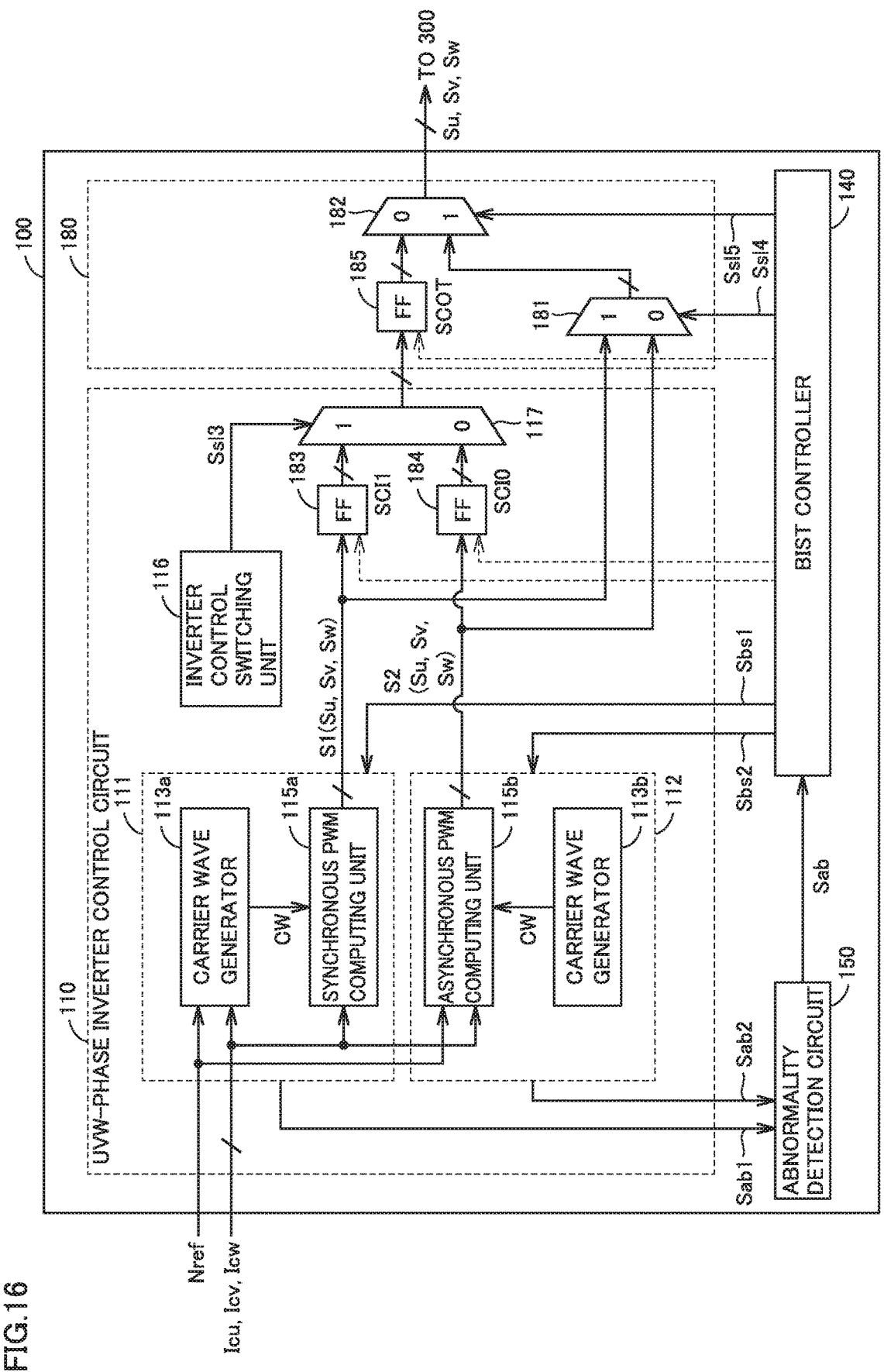
FIG. 16 is a functional block diagram illustrating an abnormality diagnosis for a selector by the motor controller according to the second embodiment.

FIG. 16 shows a functional block diagram for illustrating an abnormality diagnosis (BIST) for selector 117.

Referring to FIG. 16, the BIST for selector 117 is executed using flip-flops 183, 184 and 185 on the input side and the output side of selector 117. Flip-flops 183 to 185 are controlled to operate to output the inputted values as they are in the case where the BIST for selector 117 is not executed.

Flip-flop 183 is provided on the "1" side of the input of selector 117. Flip-flop 184 is provided on the "0" side of the input of selector 117. Also, Flip-flop 185 is provided on the output side of selector 117. During execution of the BIST for selector 117, BIST controller 140 sets the output values of flip-flops 183 and 184 intentionally at "0" or "1". Furthermore, during execution of the BIST for selector 117, BIST controller 140 can write and read the stored value of flip-flop 184. In the following description, the output value of flip-flop 183 is denoted as SCI1; the output value of flip-flop 184 is denoted as SCI0; and the stored value of flip-flop 185 is denoted as SCOT.

Referring to FIGS. 15 and 16, when the BIST for selector 117 is started (S250), BIST controller 140 sets selector control signal Ssl5 at "1" in step S251. Selector control signal Ssl4 may be set at "0" or "1", but may be set at the same value as that of selector control signal Ssl3, for example, in order to select control of the drive system.

Thereby, even when selector 117 stops outputting the signal, one of inverter control signal S1 (synchronous PWM control unit 111) and inverter control signal S2 (asynchronous PWM control unit 112) can be transmitted to pre-driver 300 by selectors 181 and 182. Thereby, also during execution of the BIST for selector 117, inverter control signals Su, Sv and Sw equivalent to those applied when not executing the abnormality diagnosis can be supplied to pre-driver 300. As a result, the operation of motor 700 can be continued.

First, in order to diagnose the path on the "1" side of selector 117, BIST controller 140 sets selector control signal Ssl3 at "1" in step S252. Then, in step S253, BIST controller 140 clears stored value SCOT of flip-flop 185 to be "0". In step S254, BIST controller 140 sets output value SCI1 from flip-flop 183 at "1".

In this state, in step S255, BIST controller 140 causes flip-flop 185 to capture, through selector 117, the value of SCI1 output from flip-flop 183. Furthermore, in step S256, BIST controller 140 checks whether captured stored value SCOT of flip-flop 185 is "1" or not.

When SCOT="1" (when it is determined as YES in S256), BIST controller 140 determines in step S257 that the path on the "1" side of selector 117 normally functions. On the other hand, when SCOT is not "1" (when it is determined as NO in S256), BIST controller 140 determines in step S258 that an abnormality occurs in the function of the path on the "1" side of selector 117.

Then, in step S260, BIST controller 140 sets selector control signal Ssl3 at "0" in order to diagnose the path on the "0" side of selector 117. Then, in step S261, BIST controller 140 clears stored value SCOT0 of flip-flop 185 to be "0". Then, in step S262, BIST controller 140 sets output value SCI0 of flip-flop 184 at "1".

In this state, in step S263, BIST controller 140 causes flip-flop 185 to capture, through selector 117, the value of SCI0 output from flip-flop 184. Furthermore, in step S264, BIST controller 140 checks whether captured stored value SCOT of flip-flop 185 is "1" or not.

When SCOT="1" (when it is determined as YES in S264), then in step S265, BIST controller 140 determines that the path on the "0" side of selector 117 normally functions. On the other hand, when SCOT is not "1" (it is determined as NO in S264), then in step S266, BIST controller 140 determines that an abnormality occurs in the function of the path on the "0" side of selector 117.

In this way, when the abnormality diagnosis on each of the "0" side and the "1" side of selector 117 ends, BIST controller 140 returns selector control signal Ssl5 to "0" in step S268. Thereby, the process in step S250 in FIG. 14 ends. As a result, the process also ends in FIG. 14 and proceeds to step S130 in FIG. 13. In this stage, the BIST for the control function of the drive system (one of synchronous PWM control unit 111 and asynchronous PWM control unit 112) and the BIST selector 117 end. In step S130, BIST controller 140 generates a BIST end signal for reporting the end of the BIST.

In step S140, BIST controller 140 determines whether the result of the BIST includes an abnormality or not. Then, when an abnormality occurs in the control function of the drive system including selector 117 (when it is determined as YES in S140), motor system 10*b* is urgently stopped in step S160. Then, the abnormality diagnosis ends.

On the other hand, when no abnormality is detected in the drive system by the BIST (when it is determined as NO in S140), BIST controller 140 proceeds the process to step S165. Then, BIST controller 140 issues a warning about generation of abnormality occurrence signals Sab1 and Sab2, but permits the operation of motor system 10*b*, and ends the process. Thereby, the abnormality diagnosis test is performed only for the drive system as a target for diagnosis.

In contrast, when an abnormality diagnosis is set to be conducted for both the drive system and the non-drive system (when it is determined as YES in S110), BIST controller 140 sets flag sat "1" in step S112. Then, in step S150, BIST controller 140 conducts an abnormality diagnosis for the drive system. Also in step S150, since flag s="1", the BIST is executed for each of the control function of the drive system and selector 117 as in step S120.

When the abnormality diagnosis for the drive system in step S150 ends, BIST controller 140 determines in step S170 whether an abnormality is detected or not in the drive system by the BIST. When an abnormality is detected in the drive system (when it is determined as YES in S170), BIST controller 140 proceeds the process to step S160, in which it urgently stops motor system 10b and ends the abnormality diagnosis.

On the other hand, when no abnormality is detected in the drive system (it is determined as NO in S170), BIST controller 140 changes flag s to "0" in step S175, and proceeds the process to step S180. In step S180, an abnormality diagnosis for the non-drive system is conducted by the control process shown in FIG. 14.

Again referring to FIG. 14, when the drive system is set as a synchronous PWM, it is determined as YES in step S210 and determined as NO in step S212 (s="0"). Thus, in steps S220 to S227, the BIST by asynchronous PWM control unit 112 is executed.

In contrast, when the drive system is set as asynchronous PWM at the start of the abnormality diagnosis, it is determined as NO in step S210 and determined as NO in step S211 (s="0"). Thus, in steps S230 to S237, the BIST is executed by synchronous PWM control unit 111. In this case, as described with reference to FIG. 14, during execution of the BIST by synchronous PWM control unit 111, the operation of motor 700 can be continued by inverter control signal S2 from asynchronous PWM control unit 112. On the other hand, during execution of the BIST by asynchronous PWM control unit 112, the operation of motor 700 can be continued by inverter control signal S1 from synchronous PWM control unit 111.

In the case of an abnormality diagnosis for the non-drive system (S180), s="0" (determined as NO in S240), and therefore, the BIST for selector 117 in step S250 is skipped. This is due to the following reason. Specifically, when any one of synchronous PWM control and asynchronous PWM control is performed, selector 117 performs the same function, thereby eliminating the need to conduct a diagnosis again after step S120 or S150.

Again referring to FIG. 13, when the abnormality diagnosis for the non-drive system (S180) ends, then in step S190, BIST controller 140 outputs the same BIST end signal as that in step S130. Furthermore, in step S195, BIST controller 140 determines whether an abnormality is detected or not in the non-drive system by the BIST. When an abnormality is detected in the non-drive system (it is determined as YES in S195), BIST controller 140 proceeds the process to step S165 and issues a warning about detection of abnormality occurrence signals Sab1 and Sab2, but permits the operation of motor system 10b and ends the process.

Furthermore, when no abnormality is detected in the non-drive system (when it is determined as NO in S195), then in step S167, BIST controller 140 performs an alarming operation while permitting the operation of motor system 10b. When it is determined as NO in step S195, a failure occurs in a part of motor controller 100 though the system is not influenced by this failure. Thus, in the alarming operation (S167), the same warning as that in step S165 can be issued. Alternatively, a warning message and the like may be able to be different between steps S165 and S167.

In this way, according to the motor controller in the second embodiment, in the configuration including two control systems (synchronous PWM control unit 111 and asynchronous PWM control unit 112) having different control functions for generating the same inverter control signal, also when the BIST is executed in one control system, the output from selector 117 is switched by inverter control switching unit 116. Thereby, the same inverter control signals Su, Sv and Sw as those in the case of not executing the abnormality diagnosis (BIST) can be supplied by means of the inverter control signals from the other control system. In other words, in the second embodiment, inverter control switching unit 116 and selector 117 can configure the "control signal supply circuit". Furthermore, selector 117 corresponds to one example of the "signal selection circuit".

As a result, the same control function does not have to be multiplexed, and the operation of motor 700 is maintained, thereby allowing execution of an abnormality self-diagnosis of the inverter control circuit without stopping the system.

It should be considered that the embodiments disclosed herein are illustrative and non-restrictive in every respect. The scope of the present disclosure is defined by the terms of the claims, rather than the description above, and is intended to include any modifications within the meaning and scope equivalent to the terms of the claims.

REFERENCE SIGNS LIST 10a, 10b motor system, 20 DC power supply, 100 motor controller, 110 UVW-phase inverter control circuit, 120 XYZ-phase inverter control circuit, 111 synchronous PWM control unit, 112 asynchronous control unit, 113, 113a, 113b carrier wave generator, 114 voltage command computing unit, 115 PWM computing unit, 115a synchronous PWM computing unit, 115b asynchronous PWM computing unit, 116 inverter control switching unit, 117, 171, 172, 181, 182 selector, 140 BIST controller, 150 abnormality detection circuit, 161, 162 phase angle conversion unit, 171x, 171y, 171z on-edge trigger, 172x, 172y, 172z off-edge trigger, 174 angle register, 175u, 175v, 175w conversion counter, 176u, 176v, 176w pulse signal generator, 180 BIST selector, 183 to 185 flip-flop, 191, 192 register, 200 motor current measurement circuit, 300 pre-driver, 400 UVW-phase inverter, 500 XYZ-phase inverter, 601 to 606 current detector, 700 motor, 710 rotor, 720 stator, 731 to 736 winding, 800 microcomputer, Sbs1, Sbs2 BIST instruction, CM1 to CM3 path, CW, CWu, CWv, CWw carrier wave, Icu, Icv, Icw, Icx, Icy, Icz inverter on/off determination signal, Iu, Iv, Iw, Ix, Iy, Iz current, Nbs rotation speed (during abnormality diagnosis test), Nref rotation speed command value, S1, S2, Su, Sv, Sw, Sx, Sy, Sz inverter control signal, Sab abnormality diagnosis instruction signal, Sab1, Sab2 abnormality occurrence signal, Ssl1 to Ssl5 selector control signal.

The invention claimed is:

1. A motor controller having a function of controlling a motor including a plurality of windings that are disposed to correspond to respective ones of a plurality of phases arranged in a predetermined sequential order, the motor controller comprising:

a first control circuit having a first control function for generating a control signal for a voltage to be applied to each of the plurality of windings, and
a self-diagnosis function for an abnormality related to the first control function;
a second control circuit having
a second control function for generating the control signal, the second control function being different from the first control function, and
a self-diagnosis function for an abnormality related to the second control function;
a self-diagnosis control circuit to instruct one control circuit of the first control circuit and the second control circuit to execute an abnormality diagnosis test by the self-diagnosis function; and
a control signal supply circuit to supply the control signal using an output from the other control circuit of the first control circuit and the second control circuit during execution of the abnormality diagnosis test in the one control circuit, the control signal being equivalent to the control signal supplied when the abnormality diagnosis test is not executed in both the first control circuit and the second control circuit.

2. The motor controller according to claim 1, wherein
the plurality of windings are divided into a first winding group and a second winding group that are disposed to be insulated from each other and to have a predetermined phase difference,
by the first control function, the first control circuit generates a first control signal for controlling a voltage to be applied to a winding belonging to the first winding group of a plurality of winding groups,
by the second control function, the second control circuit generates a second control signal for controlling a voltage to be applied to a winding belonging to the second winding group of the plurality of winding groups,
the control signal supply circuit includes
a signal conversion circuit to convert the first control signal or the second control signal output from the other control circuit according to the phase difference to generate the second control signal or the first control signal to be output from the one control circuit, and
a first signal selection circuit to selectively output one of the first control signal from the first control circuit and a conversion signal output from the signal conversion circuit to the motor, and
the first signal selection circuit outputs the first control signal when the abnormality diagnosis test is not executed in the first control circuit, and outputs the conversion signal when the abnormality diagnosis test is executed in the first control circuit.

3. The motor controller according to claim 2, wherein
the control signal supply circuit further includes
a second signal selection circuit to selectively output one of the second control signal from the second control circuit and the conversion signal output from the signal conversion circuit to the motor, and
the second signal selection circuit outputs the second control signal when the abnormality diagnosis test is not executed in the second control circuit, and outputs the conversion signal when the abnormality diagnosis test is executed in the second control circuit.

4. The motor controller according to claim 3, wherein
when the abnormality diagnosis test is executed in the one control circuit, the other control circuit generates the first control signal or the second control signal so as to operate the motor at a constant speed.

5. The motor controller according to claim 3, wherein
the first winding group is disposed to correspond to a U-phase, a V-phase, and a W-phase, and
the second winding group is disposed to correspond to
an X-phase disposed between the U-phase and the V-phase,
a Y-phase disposed between the V-phase and the W-phase, and
a Z-phase disposed between the W-phase and the U-phase.

6. The motor controller according to claim 2, wherein
when the abnormality diagnosis test is executed in the one control circuit, the other control circuit generates the first control signal or the second control signal so as to operate the motor at a constant speed.

7. The motor controller according to claim 6, wherein
the first winding group is disposed to correspond to a U-phase, a V-phase, and a W-phase, and
the second winding group is disposed to correspond to
an X-phase disposed between the U-phase and the V-phase,
a Y-phase disposed between the V-phase and the W-phase, and
a Z-phase disposed between the W-phase and the U-phase.

8. The motor controller according to claim 2, wherein
the first winding group is disposed to correspond to a U-phase, a V-phase, and a W-phase, and
the second winding group is disposed to correspond to
an X-phase disposed between the U-phase and the V-phase,
a Y-phase disposed between the V-phase and the W-phase, and
a Z-phase disposed between the W-phase and the U-phase.

9. The motor controller according to claim 1, wherein
by the first control function, the first control circuit generates a first control signal for controlling a voltage to be applied to each of a plurality of windings according to a first control scheme,
by the second control function, the second control circuit generates a second control signal for controlling a voltage to be applied to each of a plurality of windings according to a second control scheme,
the control signal supply circuit includes
a signal selection circuit to selectively output one of the first control signal from the first control circuit and the second control signal from the second control circuit to the motor, and
the signal selection circuit outputs the second control signal when the abnormality diagnosis test is executed in the first control circuit, and outputs the first control signal when the abnormality diagnosis test is executed in the second control circuit.

10. The motor controller according to claim 9, wherein
the first control circuit generates the first control signal according to voltage comparison between a command voltage value of the voltage to be applied to each of the plurality of windings and a carrier wave having a frequency that changes according to a rotation speed of the motor, and
the second control circuit generates the second control signal according to voltage comparison between the command voltage value and a carrier wave having a fixed frequency.

* * * * *